United States Patent
Yamamoto

(10) Patent No.: US 9,096,260 B1
(45) Date of Patent: Aug. 4, 2015

(54) IMPACT ABSORBING STEERING APPARATUS

(71) Applicant: NSK Ltd., Tokyo (JP)

(72) Inventor: Ko Yamamoto, Gunma (JP)

(73) Assignee: NSK Ltd. (JP)

( * ) Notice: Subject to any disclaimer, the term of this patent is extended or adjusted under 35 U.S.C. 154(b) by 0 days.

(21) Appl. No.: 14/009,402

(22) PCT Filed: Dec. 14, 2012

(86) PCT No.: PCT/JP2012/082535
§ 371 (c)(1),
(2) Date: Oct. 2, 2013

(87) PCT Pub. No.: WO2013/132719
PCT Pub. Date: Sep. 12, 2013

(30) Foreign Application Priority Data

Mar. 6, 2012 (JP) .................................. 2012-048900

(51) Int. Cl.
*B62D 1/19* (2006.01)
*B62D 1/189* (2006.01)
*B62D 1/181* (2006.01)

(52) U.S. Cl.
CPC ............... *B62D 1/195* (2013.01); *B62D 1/181* (2013.01); *B62D 1/189* (2013.01)

(58) Field of Classification Search
CPC ......... B62D 1/195; B62D 1/189; B62D 1/181
See application file for complete search history.

(56) References Cited

U.S. PATENT DOCUMENTS

| | | | |
|---|---|---|---|
| 2005/0167962 A1* | 8/2005 | Sato et al. | 280/775 |
| 2008/0084055 A1* | 4/2008 | Cymbal et al. | 280/777 |
| 2008/0174096 A1* | 7/2008 | Oh | 280/777 |
| 2012/0285285 A1* | 11/2012 | Tinnin | 74/493 |
| 2014/0083236 A1* | 3/2014 | Moriyama et al. | 74/492 |

FOREIGN PATENT DOCUMENTS

| | | |
|---|---|---|
| JP | 10-315986 | 2/1998 |
| JP | 2009-083611 | 4/2009 |
| JP | 2010-116008 | 5/2010 |
| JP | 2012-001080 | 5/2012 |

* cited by examiner

*Primary Examiner* — Drew Brown
(74) *Attorney, Agent, or Firm* — Hartman Global IP Law; Gary M. Hartman; Domenica N. S. Hartman

(57) ABSTRACT

A structure is achieved in which two portions in the axial direction of a cable 38 for electric equipment by an energy-absorbing member 35 on an inner column 9a side and a cable support bracket 52 on an outer column 10a side, such that the cable 38 can be suppressed from becoming a resistance to forward displacement of a steering wheel during a secondary collision. The energy-absorbing member 35 has a support plate section 46, part of which displaces in the downward direction during a secondary collision. Part of the middle section of two portions of the cable 38 in the axial direction is supported by the support plate section 46. During a secondary collision, the middle section of the cable 38 displaces and is bent in the downward direction as the support plate section 46 deforms. As a result, the cable 38 is suppressed from tightening in the axial direction during a secondary collision.

13 Claims, 22 Drawing Sheets

Fig.7 (A)
Fig.7 (B)
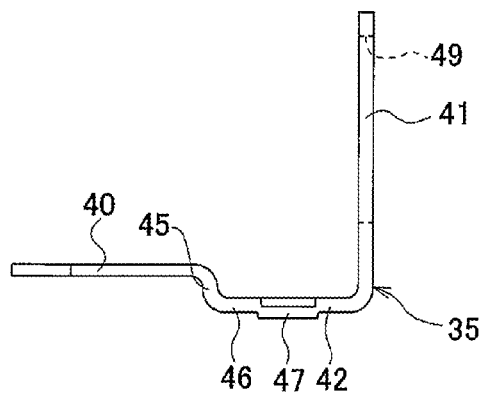
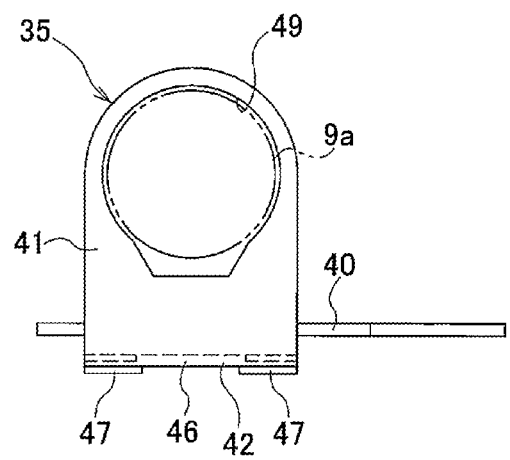
Fig.7 (C)
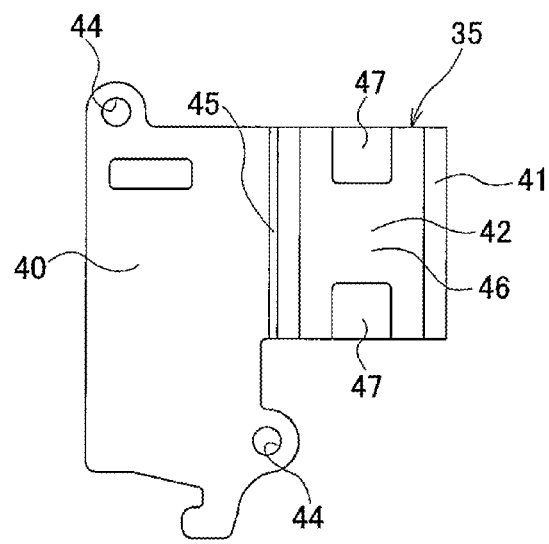
Fig.8
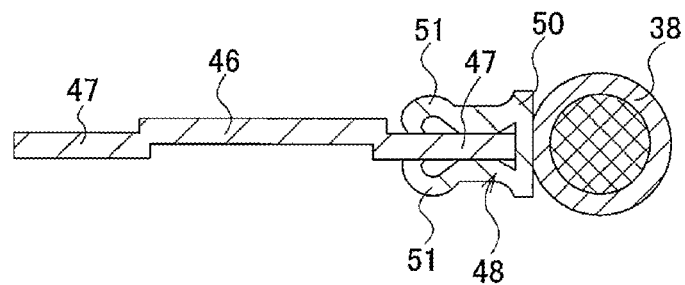

IMPACT ABSORBING STEERING APPARATUS

TECHNICAL FIELD

The present invention relates to an impact absorbing steering apparatus that is able to displace in the forward direction of the steering wheel while absorbing impact energy that is applied to the steering wheel from the body of a driver during a secondary collision.

BACKGROUND ART

FIG. 22 and FIG. 23 illustrate an example of a conventionally known steering apparatus. This steering apparatus has a function for allowing adjustment of the up-down position and the forward-backward position of the steering wheel 1 according to the body size and driving posture of the driver, a function for reducing the force required by the driver to operate the steering wheel 1, and a function for allowing displacement of the steering wheel 1 in the forward direction when a secondary collision occurs and the body of the driver collides with the steering wheel 1 during a collision accident. In this specification, the forward-backward direction, the left-right direction and the up-down direction, unless specified otherwise, mean the forward-backward, the left-right and the up-down direction of a vehicle respectively.

This kind of steering apparatus has: a steering shaft 2, the steering wheel 1 being fastened to the rear-end section thereof; a steering column 3 that supports the steering shaft 2 on the inside thereof so as to be able to rotate freely; a steering force auxiliary apparatus 4 that applies an auxiliary torque to the steering shaft 2; and a steering gear unit 6 for causing a pair of left and right tie rods 5 to displace (pushes or pulls) based on the rotation of the steering shaft 2.

The steering shaft 2 is constructed by fitting the front-end section of an outer shaft 8 that is located on the rear side around the rear-end section of an inner shaft 7 that is located on the front side so that rotational force can be freely transmitted, and so that sliding movement in the axial direction is possible. Moreover, the steering column 3 is constructed by fitting the front-end section of an outer column 10, which is a rear-side column that is located on the rear side, around the rear-end section of an inner column 9, which is a front-side column that is located on the front side, so that sliding movement in the axial direction is possible. With the inner shaft 7 and the outer shaft 8 displacing relative to each other in the axial direction, and with the inner column 9 and the outer column 10 displacing relative to each other in the axial direction, it is possible to adjust the forward-backward position of the steering wheel 1, and it is possible for the entire length of the steering shaft 2 to contract during a collision accident.

The front-end section of the inner column 9 is joined and fastened to the rear-end surface of a gear housing 11 of the steering force auxiliary apparatus 4. Moreover, the inner shaft 7 is inserted into the gear housing 11, and the front-end section of the inner shaft 7 is connected to an input shaft of the steering force auxiliary apparatus 4. Furthermore, the front-end section of an output shaft 12 of the steering force auxiliary apparatus 4 that is connected to the input shaft by way of a torsion bar protrudes from the front-end surface of the gear housing 11.

The inner column 9 is supported by the vehicle body 13 so as to be prevented from displacing in the axial direction, and so as to only be able to pivot around a tilt pivot shaft 14 that is arranged in the left-right direction (front-back direction in FIG. 22) of the vehicle body 13. In the example in the figures, the tilt pivot shaft 14 is supported by the vehicle body 13 by way of a front support bracket 15, and is inserted into a support cylinder 16 that is provided on the upper part of the front end of the gear housing 11. Therefore, the inner column 9 does not displace in the forward direction even during a secondary collision.

On the other hand, the middle section of the outer column 10 is supported by part of the vehicle body 13 by a rear support bracket 17 so at to be able to detach (drop) in the forward direction when a strong impact is applied in the forward direction. In order to accomplish this, as illustrated in FIG. 23, a pair of installation plate sections 19 that protrude to the sides of the steering column 3 are provided on the top-end section of a pair of sidewall sections 18 of the rear support bracket 17, and notches 20 that are open to the rear-end edge of the installation plate section 19 is provided in each of the installation plate sections 19. Capsules 21 that are fastened to the vehicle body 13 by bolts (not illustrated in the figure) are locked in the notches 20. These capsules 21 have through holes 22 in the middle section thereof for inserting bolts.

During a collision accident, when a secondary collision occurs in which the body of the driver collides with the steering wheel 1, a large impact load is applied in the forward direction to the steering column 3 by way of the steering shaft 2. And the steering shaft 2 and the steering column 3 have a tendency to contract the entire length of them. In other words, the rear support bracket 17 tries to displace in the forward direction with the outer column 10, however, the pair of capsules 21 are stayed in place by the bolts. As a result, the capsules 21 come out in the backward direction from the notches 20, which allows the steering wheel 1 to displace in the forward direction.

Moreover, in order to allow adjustment of the forward-backward position and the up-down position of the steering wheel 1, the outer column 10 is supported by the rear support bracket 17 so as to be able to move in the forward-backward direction and the up-down direction. More specifically, a supported bracket 23 is welded and fastened to the bottom surface in the middle section of the outer column 10, and this supported bracket 23 is held by a pair of left and right sidewall sections 18 of the rear support bracket 17. Furthermore, forward-backward long holes 24 that extend in the forward-backward direction are formed in portions of left and right sidewalls of the supported bracket 23 that are aligned with each other. On the other hand, up-down long holes 25 that extend in the up-down direction are formed in portions of the sidewall sections 18, that are aligned with each other such that the up-down long holes 25 are aligned with part of the forward-backward long holes 24. An adjustment rod 26 is inserted through the forward-backward long holes 24 and up-down long holes 25, and an adjustment nut 27 is screwed onto a male screw section on the tip end section of the adjustment rod 26 that protrudes to the outside from one of the sidewall sections 18 (left side in FIG. 23). In this state, an outward facing flange shaped head section 28 that exists on the base-end section of the adjustment rod 26 engages with the up-down long hole 25 that is formed in the other sidewall section 18 (right side in FIG. 23) so as to be able to move up and down.

The adjustment nut 27 can be freely turned by an adjustment lever 29. Therefore, by rotating the adjustment nut 27 by operating the adjustment lever 29 and changing the spacing between the adjustment nut 27 and the head section 28 of the adjustment rod 26, the steering column 3 (outer column 10) to which the supported bracket 23 is fastened can be fastened to or released from the rear support bracket 17. When the spacing between the adjustment nut 27 and the head section 28 is widened, it is possible to adjust the forward-backward position of the steering wheel 1 by moving the steering column 3 (outer column 10) in the forward-backward direction within the displaceable range in which the adjustment rod 26 can displace inside the forward-backward long holes 24. Moreover, it is possible to adjust the up-down position of the steering wheel 1 by moving the steering column 3 within the displaceable range in which the adjustment rod 26 can displace inside the up-down long holes 25. When doing this, the steering column 3 pivotally displaces in the up-down direction around the tilt pivot shaft 14.

The rear-end section of the intermediate shaft 31 is connected to the front-end section of the output shaft 12 of the steering force auxiliary apparatus 4 by way of a universal joint 30. An input shaft 33 of the steering gear unit 6 is connected to the front-end section of the intermediate shaft 31 by way of another universal joint 32. The input shaft 33 is connected to the pinion of the rack and pinion (not illustrated in the figure) of the steering gear unit 6. The tie rods 5 are connected to both the left and right end sections of the rack that engages with the pinion, and by pushing and pulling the tie rods 5 on both sides according to the displacement in the axial direction of the rack, a desired steering angle is applied to the left and right steered wheels. Moreover, the steering force auxiliary apparatus 4 transmits the rotation of an electric motor 34, which is a power source, to the output shaft 12 by way of a worm reducer that is provided on the inside of the gear housing 11, and applies an auxiliary torque having a specified size in a specified direction to the output shaft 12.

Electric equipment such as a steering lock apparatus, combination switch and the like are installed at the rear-end section of the outer column 10. The rear-end section of cables such as power lines and signal lines are connected to this electric equipment, however, these cables are in the form of a cable harness that bundles the cables except the rear end sections, and this cable harness is covered with an insulating material. Cables such as these are arranged so as to run along the steering column 3 in the forward-backward direction. In order for this, a cable support bracket that is used for supporting the middle section of the cable is provided on part of the steering column 3 or a member that is located near the steering column 3, as typically done in the past. For example, JP 2010-116008 (A) discloses a structure in which a cable support bracket is provided on the side end section of a rear support bracket that supports the outer column.

On the other hand, a structure in which an impact energy that is applied to the steering wheel 1 from the body of the driver is absorbed by an energy-absorbing member plastically deforming as the steering wheel 1 displaces in the forward direction during a secondary collision has heretofore been known. For example, JP 2009-83611 (A) discloses a structure in which an energy-absorbing member that is made using metal plate plastically deforms due to an impact load that is applied to the steering wheel during a secondary collision. When applying a structure such as this, when the steering wheel 1 displaces in the forward direction, the cable tightens or stiffens in the axial direction and acts like a stopper rod between the inner column 9 or a member fastened to the inner column 9 and the outer column 10 or a member fastened to the outer column 10, which are supposed to displace relative to each other, and becomes a resistance against the displacement of the steering wheel 1 in the forward direction. As a result, there is a possibility that the impact absorbing performance by the plastic deformation of the energy-absorbing member will not be achieved as desired.

RELATED LITERATURE

Patent Literature

[Patent Literature 1] JP 2010-116008 (A)
[Patent Literature 2] JP 2009-83611 (A)

SUMMARY OF THE INVENTION

Problem to be Solved by the Invention

Taking the situation described above into consideration, the objective of the present invention is to achieve a structure of an impact absorbing steering apparatus that is capable of preventing or suppressing the cable that is connected to electric equipment that is installed at the rear-end section of the rear column from becoming a resistance against displacement of the steering wheel in the forward direction during a secondary collision.

Means for Solving the Problems

The impact absorbing steering apparatus of the present invention includes: a steering column that supports a steering shaft, to an end section of which a steering wheel can be fastened, so as to be able to rotate freely on the inside of the steering column; and an energy-absorbing member that, by a pressed plate section thereof being pressed during a secondary collision and part of the energy-absorbing member plastically deforming, absorbs impact energy that is applied to the steering column from the steering wheel.

The steering column has a front column that is located on the front side with its movement in the forward-backward direction regulated, and a rear column that is combined with the front column so as to be able to displace in the axial direction with respect to the rear end section of the front column.

The energy-absorbing member has a base plate section, a pressed plate section that is directly or indirectly connected to the base plate section, and a support plate section that is indirectly or directly connected to the pressed plate section or both the base plate section and the pressed plate section, with these sections being integrally formed with each other. The base plate section is fastened to one column of either the front column or the rear column or to a portion that is fastened to that one column. The pressed plate section is located on the side of the other column of either the front column or the rear column. The support plate section is located along the steering column and supports a cable that is connected to electric equipment that is fastened to the rear-end section of the rear column. The energy-absorbing member is such that, when the pressed plate section is pressed by the other column or a portion that is fastened to the other column, part of the energy-absorbing member plastically deforms, and at least the portion of the support plate section that supports the cable displaces in the downward direction without plastically deforming.

More specifically, the energy-absorbing member includes:
a base plate section that is fastened to one column of either the front column or the rear column or to a portion that is fastened to that one column;
a pressed plate section that is separated from or adjacent to the base plate section in the axial direction of the steering column and is indirectly or directly connected to the base plate section, and that is pressed by the other column of either the front column or the rear column or a portion that is fastened to that other column due to displacement in the forward direction of the rear column during a secondary collision; and a support plate section that is located along the steering column and is indirectly or directly connected to the pressed plate section, or both the base plate section and pressed plate section, and when the pressed plate section is pressed during a secondary collision, at least part thereof displaces toward the outside in the radial direction of the steering column.

The energy-absorbing member is constructed such that by the pressed plate section being pressed during a secondary collision, part of the energy-absorbing member plastically deforms and absorbs impact energy that is applied to the rear column from the steering wheel.

The impact absorbing steering apparatus of the present invention is constructed such that the support plate section is connected to electric equipment that is fastened to the rear-end section of the rear column, and the support plate section supports one of two portions of a cable that is arranged in the forward-backward direction along the steering column, which are separated from each other in the axial direction of the steering column, and the rear column supports the other of the two portions.

Preferably, the support plate section is constructed such that by the pressed plate section being pressed during a secondary collision, the end section of the support plate section that is on the opposite side from the base plate section pivots in a direction toward the outside in the radial direction of the steering column around the end section of the support plate section on the base plate section side.

The location of the energy-absorbing member is arbitrary, however, normally, the energy-absorbing member is arranged so that the top surface of the support plate section faces the bottom surfaces of the steering column.

Preferably, a reinforcing section is provided in part of the support plate section, and the bending rigidity of the portion where this reinforcing section is provided is improved.

In this case, preferably the reinforcing section is a reinforcing rib that is formed by plastically deforming part of the support plate section by a stamping press process.

A first form of the impact absorbing steering apparatus of the present invention further includes a downward hanging plate section that is bent downward from the edge on the end of the base plate section, wherein the support plate section bends and extends from the edge on the bottom end of the downward hanging plate section in the opposite direction from the base plate section, and the pressed plate section bends and extends upward from at least one portion in the width direction of the edge on the end of the support plate section on the opposite side from the base plate section.

More specifically, in the first form of the impact absorbing steering apparatus, the front column is an inner column; the rear column is an outer column that fits around the rear-end section of the inner column so as to be able to slide in the axial direction; a gear housing of a steering force auxiliary apparatus, which is a portion fastened to the front column, is fastened to the front-end section of the inner column; the base plate section is fastened to the bottom surface of the rear-end section of the gear housing; the pressed plate section has a through hole for a column through which the middle section of the inner column is inserted; and the energy-absorbing member is such that when the outer column displaces in the forward direction during a secondary collision, the pressed plate section is pressed in the forward direction by the outer column or a portion that is fastened to the outer column, which is a portion fastened to the rear column, which causes a portion of the support plate section that supports the cable to displace in a downward direction.

A second form of the impact absorbing steering apparatus of the present invention further includes: a downward hanging plate section that is bent downward from the edge on the end of the base plate section; and a pivoting plate section that is located between the support plate section and the pressed plate section; wherein the support plate section bends and extends from the edge on the bottom end of the downward hanging plate section in the opposite direction from the base plate section; the pivoting plate section inclines and extends upward toward the pressed plate section from at least part in the width direction of the edge on the end of the support plate section that is on the opposite side from the base plate section, and the pressed plate section bends and extends upward from the edge on the end of the pivoting plate section that is on the opposite side from the base plate section.

More specifically, in the second form of an impact absorbing steering apparatus, the front column is an inner column; the rear column is an outer column that fits around the rear-end section of the inner column so as to be able to slide in the axial direction; a gear housing of a steering force auxiliary apparatus, which is a portion fastened to the front column, is fastened to the front-end section of the inner column; the base plate section is fastened to the bottom surface of the rear-end section of the gear housing; the pressed plate section has a through hole for a column through which the middle section of the inner column is inserted; and the energy-absorbing member is such that when the outer column displaces in the forward direction during a secondary collision, the pressed plate section is pressed in the forward direction by the outer column or a portion that is fastened to the outer column, which is a portion fastened to the rear column, which causes a portion of the support plate section to displace in a downward direction.

In either form, the support plate section preferably includes an extending section in a portion that is adjacent in the width direction of the portion where the base plate section and pressed plate section connect and that extends in the forward-backward direction; wherein the extending section supports one of the two portions of the cable that are separated in the axial direction.

In a third form of the impact absorbing steering apparatus of the present invention, the front column is an inner column; the rear column is an outer column that fits around the rear-end section of the inner column so as to be able to slide in the axial direction; a gear housing of a steering force auxiliary apparatus, which is a portion fastened to the front column, is fastened to the front-end section of the inner column; the base plate section is fastened to the bottom surface of the front-end section of the outer column; the pressed plate section extends downward going in the forward direction from the edge on the front end of the base section; and when the outer column displaces in the forward direction during a secondary collision, the surface on the top side of the pressed plate section is pressed toward the rear by the gear housing or a portion fastened to the gear housing, which causes the pressed plate section to pivot in a direction that causes the front-end section of the pressed plate section to displace downward, and causes the portion of the pressed plate section that is pressed by the gear housing or a portion fastened to the gear housing to move toward the rear.

In a fourth form of the impact absorbing steering apparatus of the present invention, the front column is an inner column; the rear column is an outer column that fits around the rear-end section of the inner column so as to be able to slide in the axial direction; a gear housing of a steering force auxiliary apparatus, which is a portion fastened to the front column, is fastened to the front-end section of the inner column; the base plate section is fastened to the bottom surface of the rear-end section of the gear housing; the pressed plate section extends downward going in the forward direction from the edge on the rear end of the base plate section; and when the outer column displaces in the forward direction during a secondary collision, the surface on the top side of the pressed plate section is pressed in the forward direction by the outer column or a portion fastened to the outer column, which causes the pressed plate section to pivot in a direction that causes the rear-end section of the pressed plate section to displace downward, and causes the portion of the pressed plate section that is pressed by the outer column or a portion fastened to the outer column to move in the forward direction.

Effect of the Invention

In the case of the impact absorbing steering apparatus of the present invention, as the steering wheel and rear column displace in the forward direction during a secondary collision, part of the energy-absorbing member plastically deforms, and the space in the axial direction between portions (support plate section and rear column) that support the cable at two locations in the axial direction contracts, one of the portions of the two locations in the axial direction of the cable displaces (is pulled) toward the outside in the radial direction of the steering column together with the support plate section. Therefore, the portion between the portions of the two locations in the axial direction of the cable is suppressed or prevented from tightening or stiffening in the axial direction. In other words, it is possible to suppress or prevent the cable from becoming a resistance against the forward displacement of the steering wheel and rear column during a secondary collision. As a result, the impact absorbing performance based on the plastic deformation of the energy-absorbing member can be efficiently achieved. Moreover, in the case of the present invention, the energy-absorbing member is used as a cable support member for supporting part of the cable, so by sharing the use of parts, it is also possible to reduce costs.

BRIEF DESCRIPTION OF THE DRAWINGS

FIG. 7A is a right side view of an energy-absorbing member of the first example; FIG. 7B is a view as seen from the right in FIG. 7A; and FIG. 7C is a view as seen from underneath in FIG. 7A.

FIG. 8 is an enlarged cross-sectional view of section a-a in FIG. 6.

MODES FOR CARRYING OUT THE INVENTION

First Example

Figure 22:
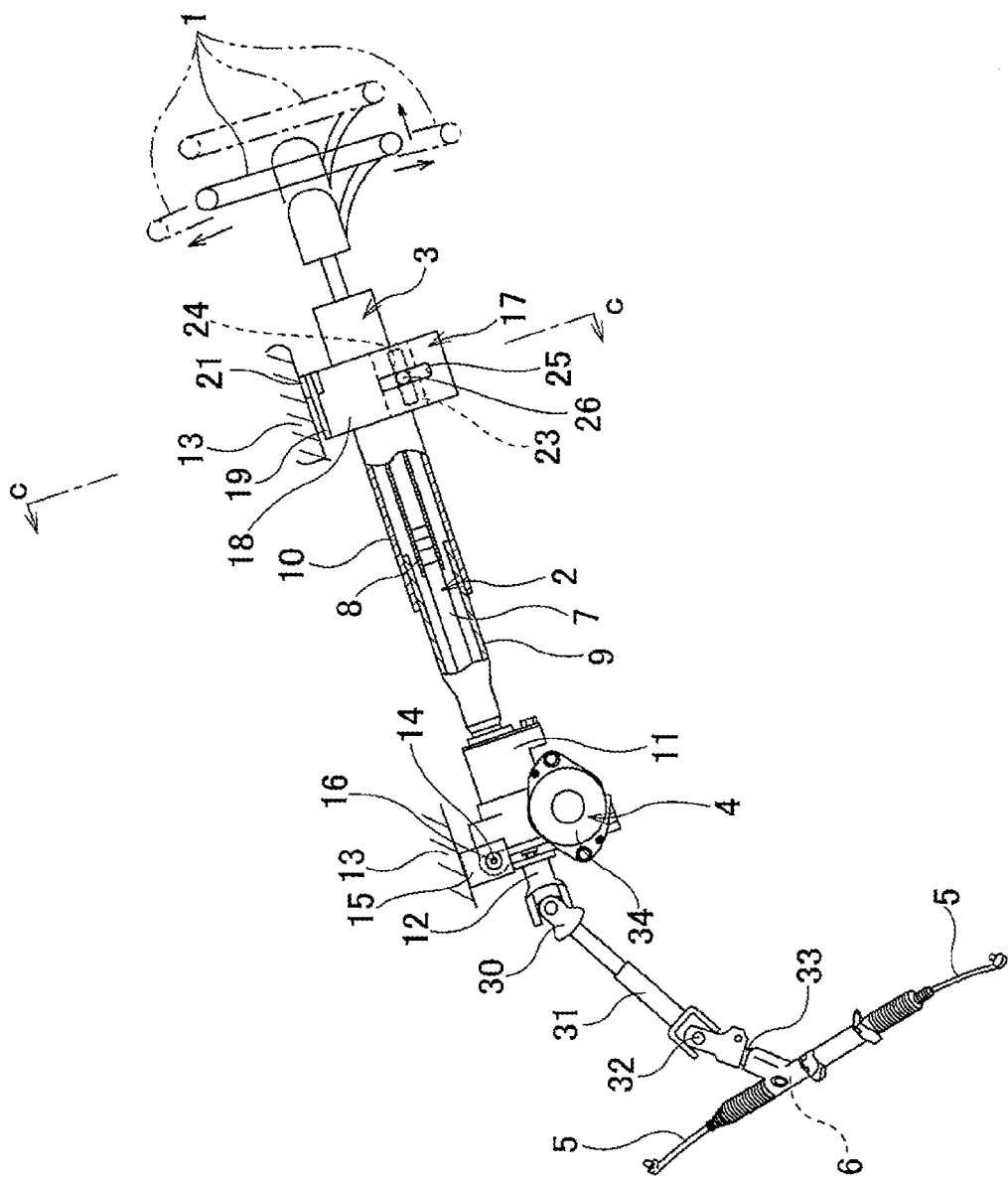
FIG. 22 is a simplified side view illustrating an example of a conventionally known steering apparatus in a state in which part has been cut away.
Figure 23:
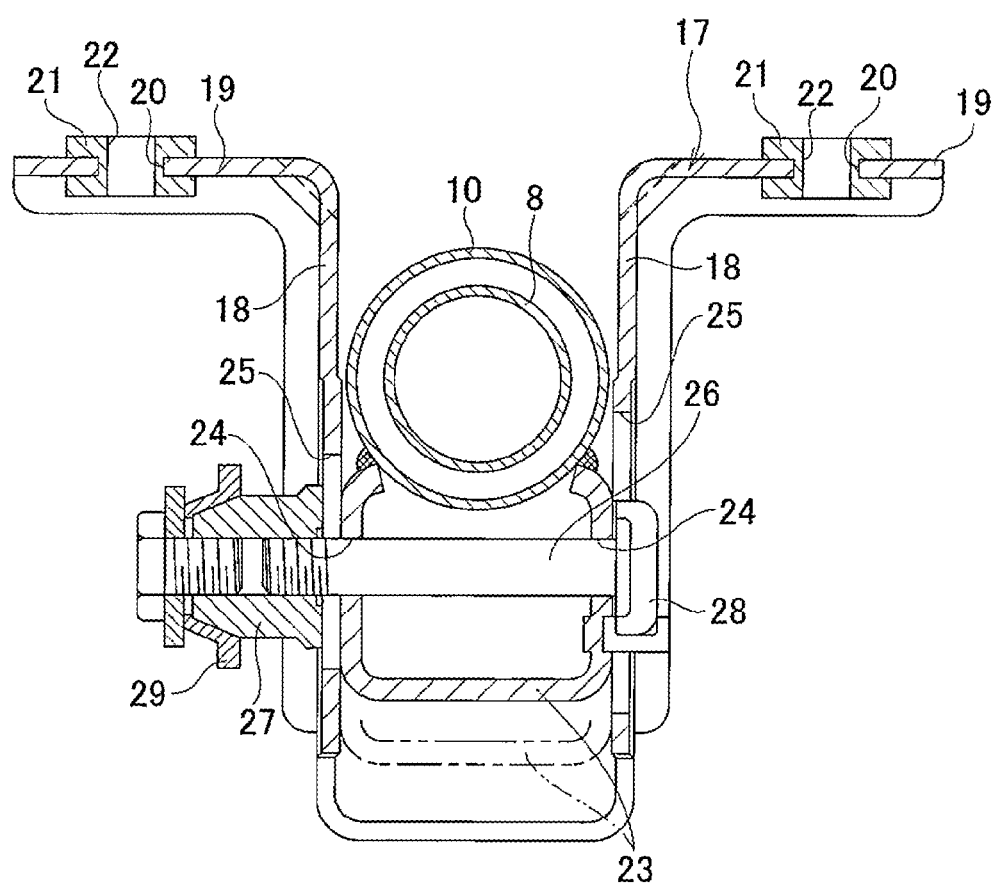
FIG. 23 is an enlarged cross-sectional view of section c-c in FIG. 22.

FIG. 1 to FIG. 9 illustrate a first example of an embodiment of the present invention. Features of this example are that it provides an energy-absorbing member 35 for absorbing impact energy that is applied to the steering wheel 1 from the body of a driver during a secondary collision (see FIG. 22), and devising a support structure for a cable (cable harness) 38 that is connected to a steering lock apparatus 36 and a combination switch 37 (illustrated by imaginary lines in only FIG. 3 and FIG. 4), which are electric equipment that are installed at the rear-end section of the outer column (rear column) 10*a* of the steering column 3*a*. Except that in regards to the position adjustment function of the steering wheel 1 in which only adjustment of the up-down position is possible, and the forward-backward position cannot be adjusted, the structure and functions of other parts are basically the same as in the conventional construction illustrated in FIG. 22 and FIG. 23. Therefore the same numerals are used for the same parts.

Figure 1:
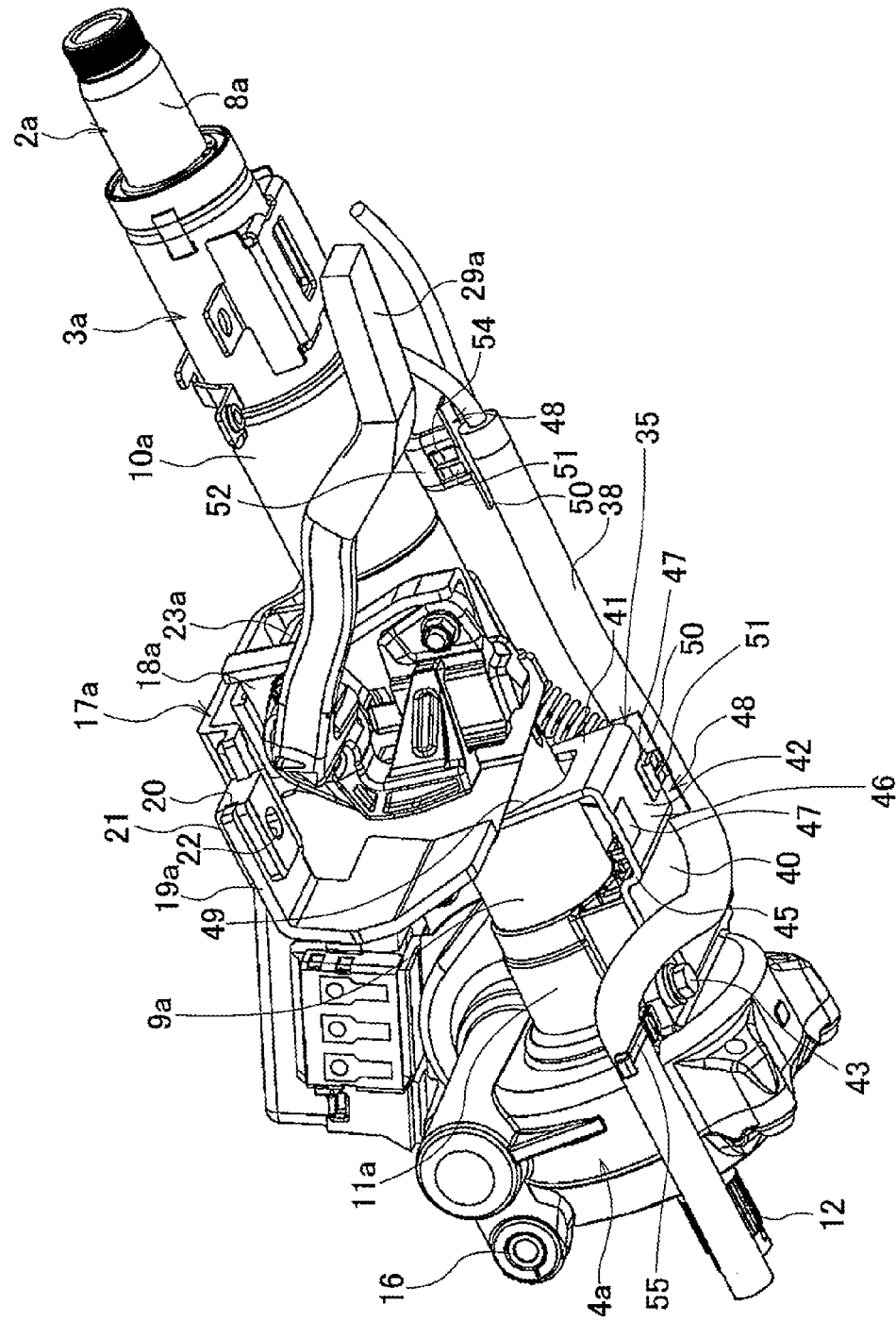
FIG. 1 is a perspective view of a first example of an embodiment of the present invention in the normal state as seen from the left side underneath the rear section.
Figure 2:
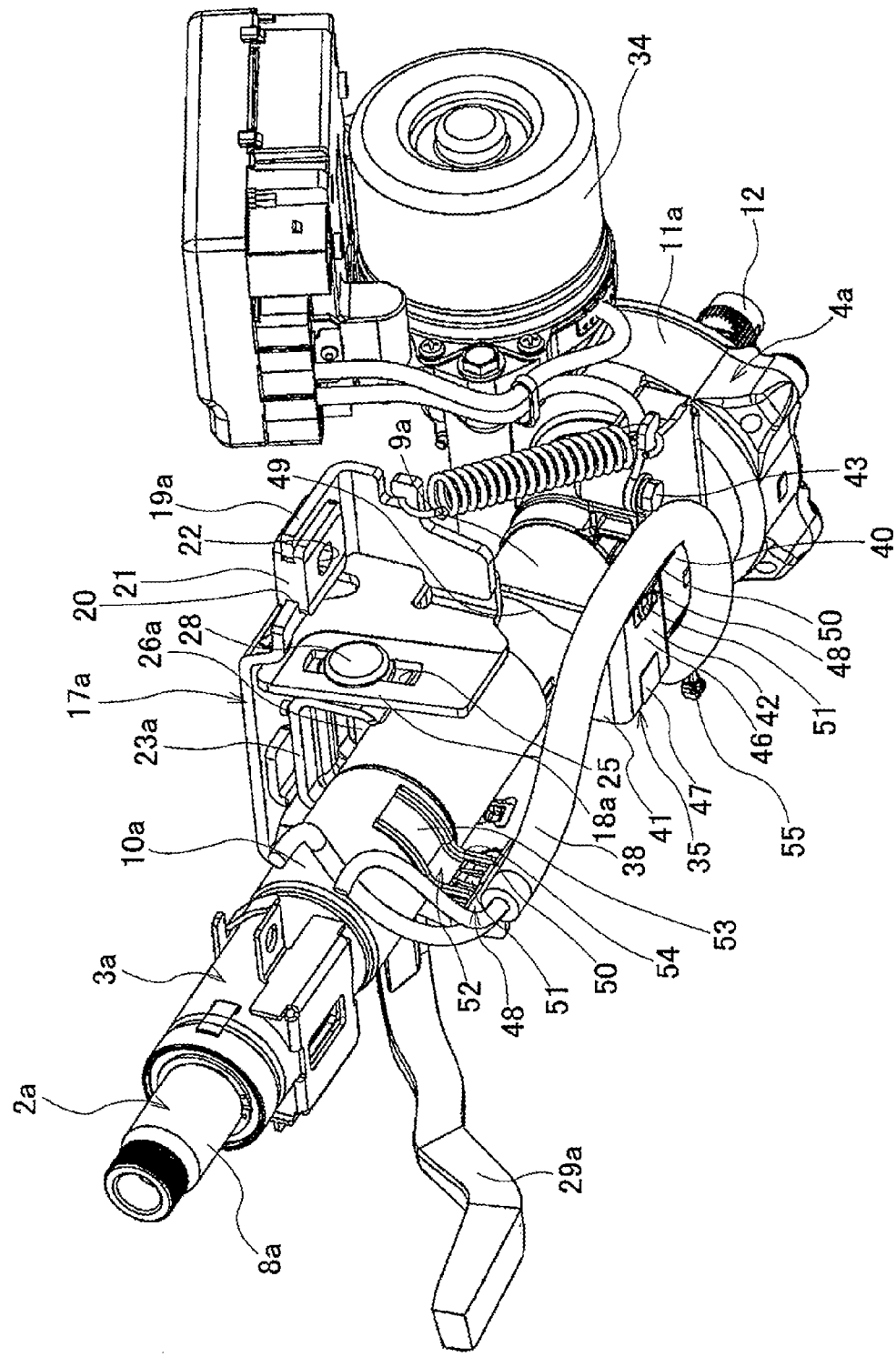
FIG. 2 is a perspective view of the first example in the normal state as seen from the right side underneath the rear section.
Figure 3:
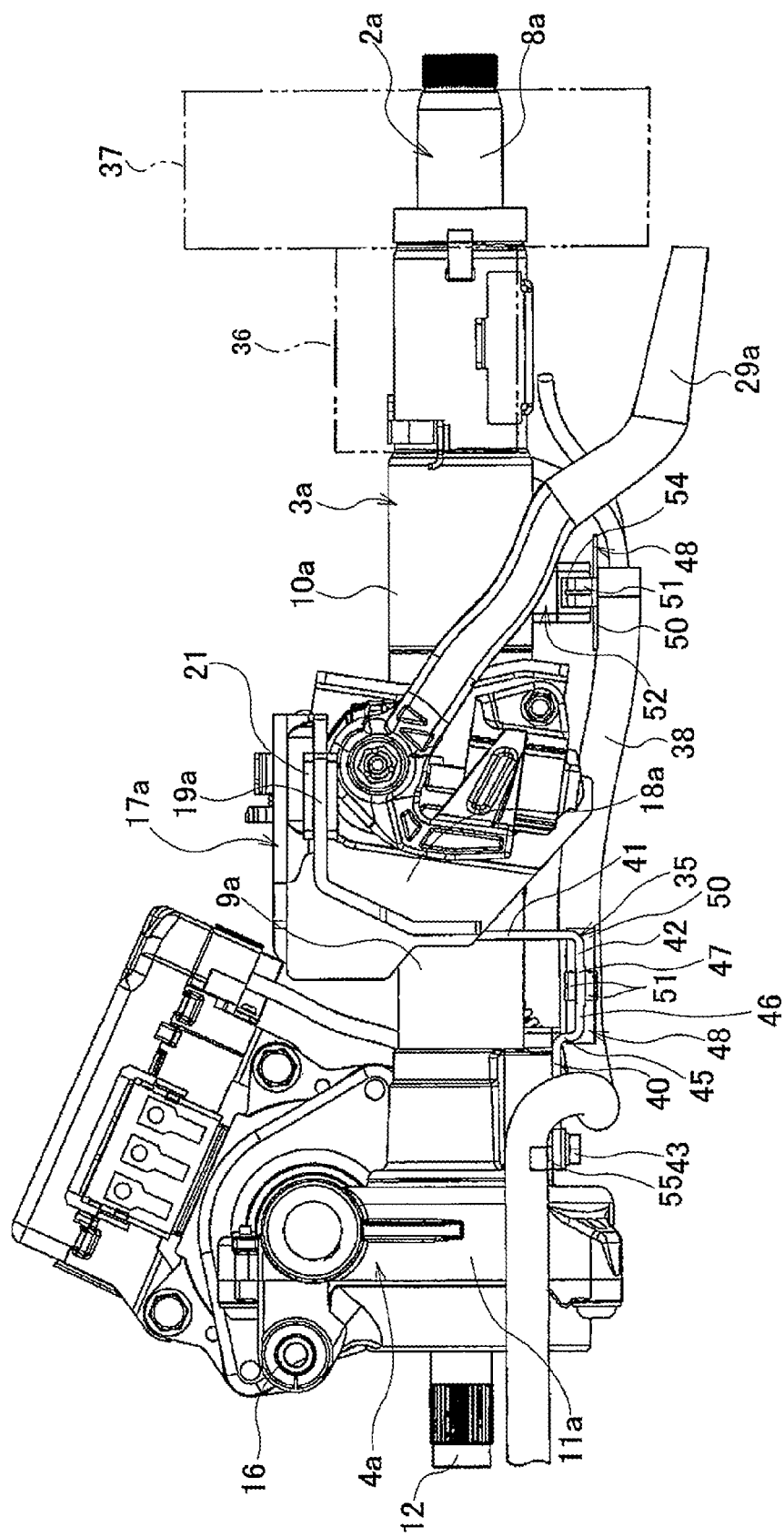
FIG. 3 is a side view of the first example in the normal state as seen from the left.
Figure 4:
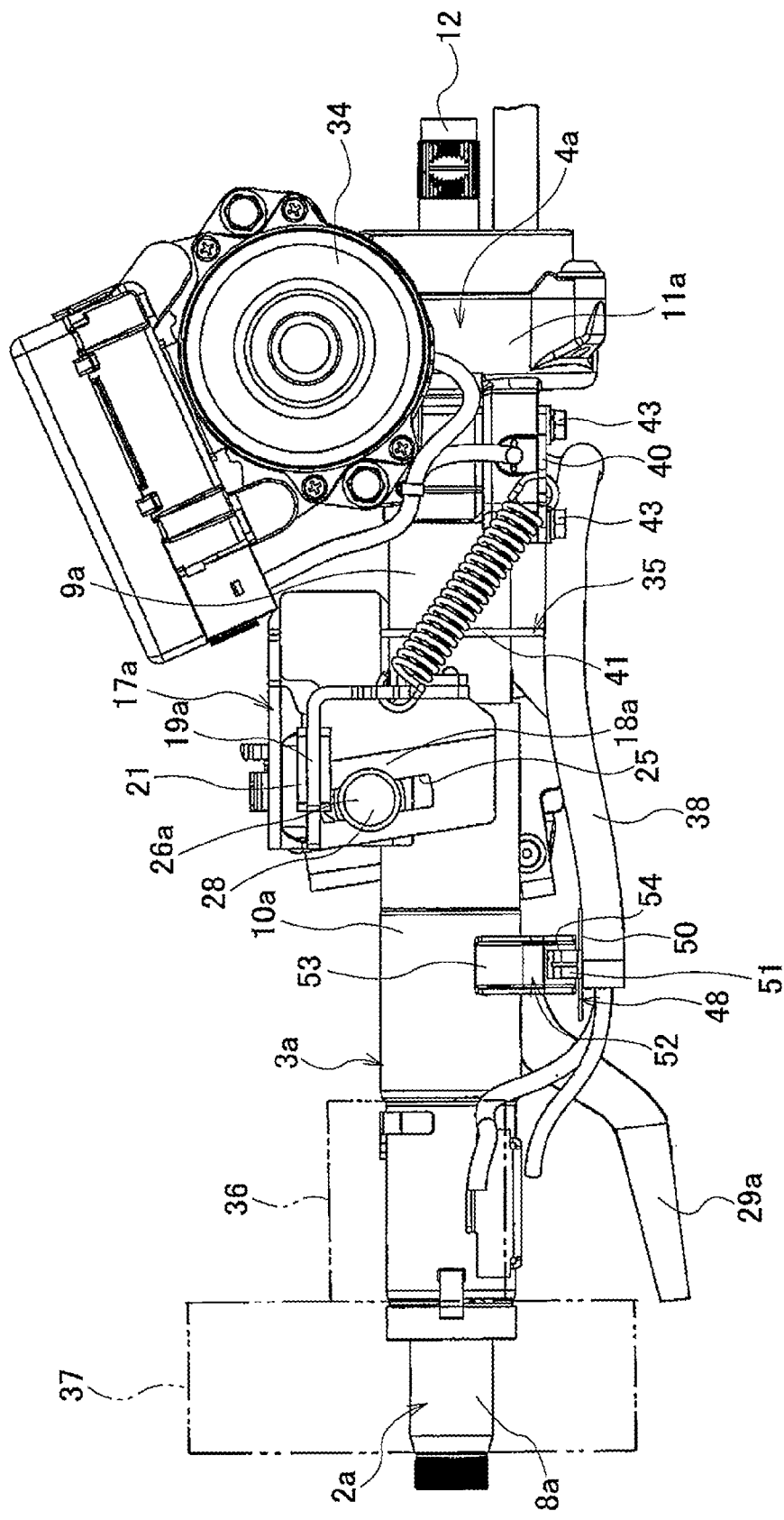
FIG. 4 is a side view of the first example in the normal state as seen from the right.
Figure 5:
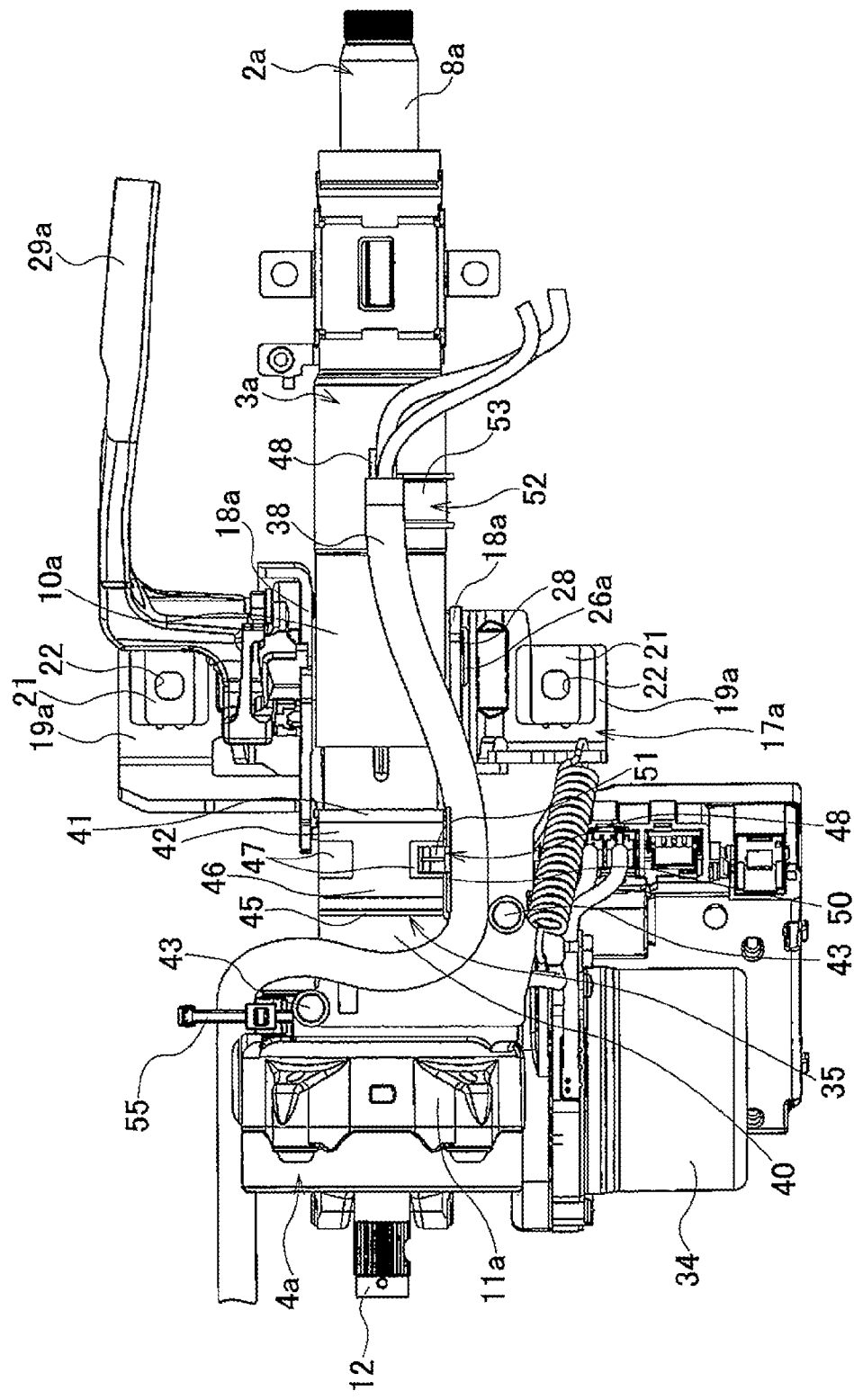
FIG. 5 is a view as seen from underneath in FIG. 3.
Figure 6:
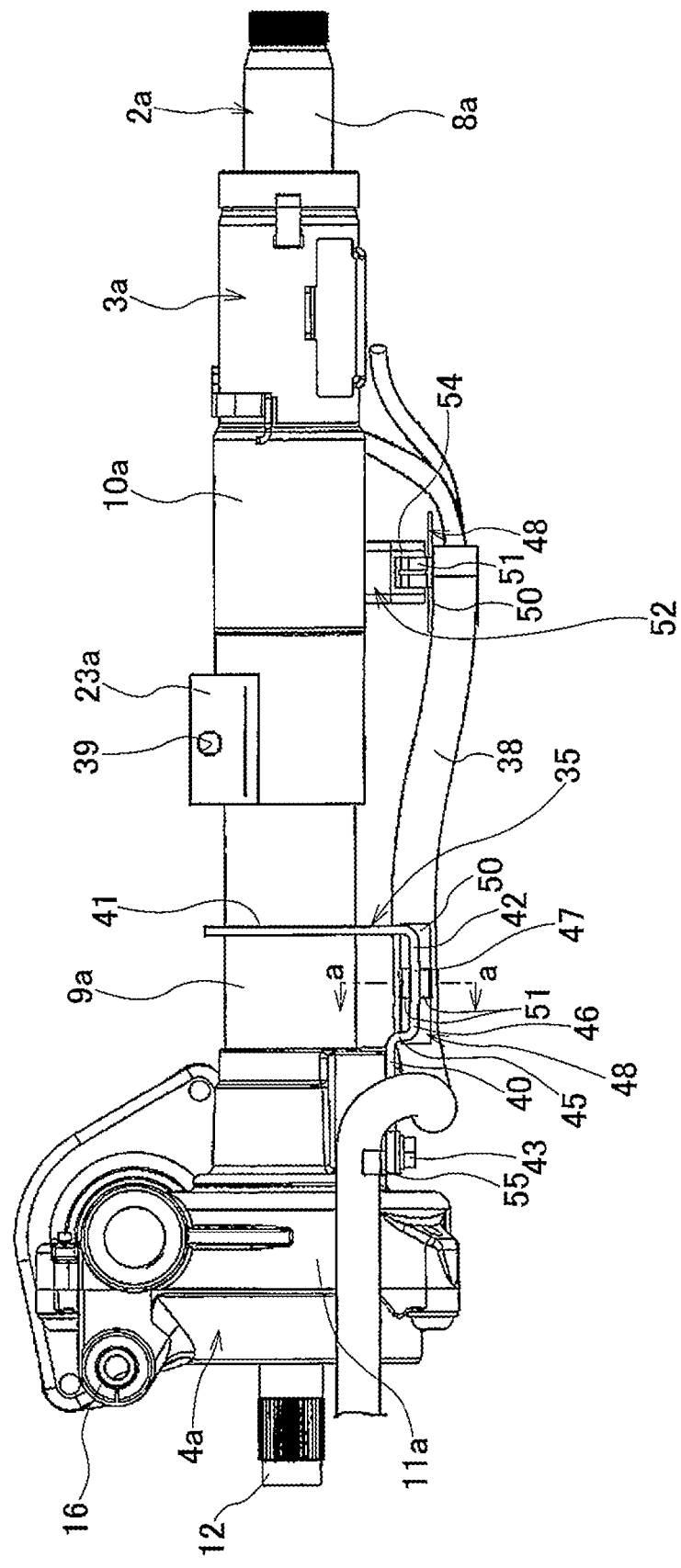
FIG. 6 is a view similar to FIG. 3 and illustrates the state with part of the members omitted.
Figure 9:
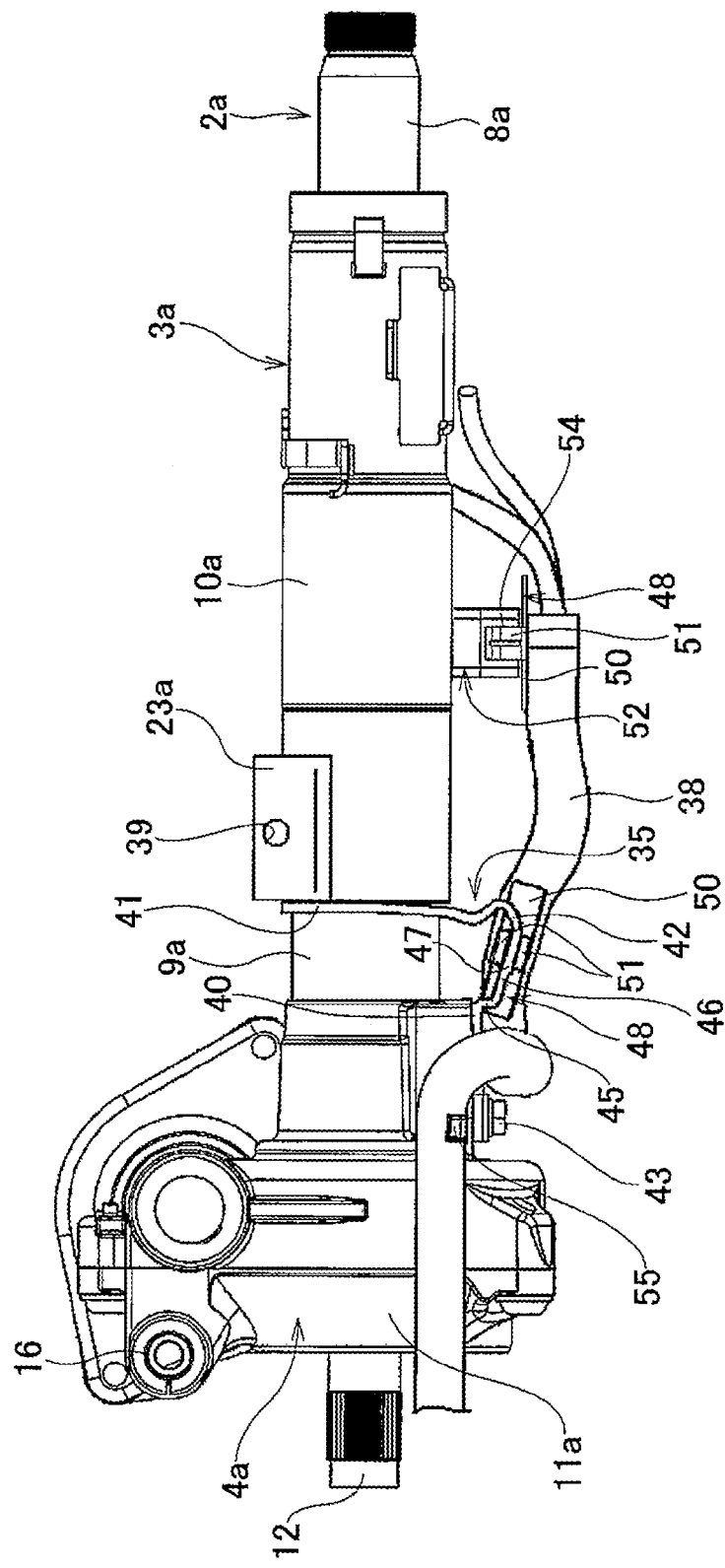
FIG. 9 is a drawing similar to FIG. 6 of the first example in a state in which the outer column has displaced in the forward direction due to a secondary collision.
Figure 10:
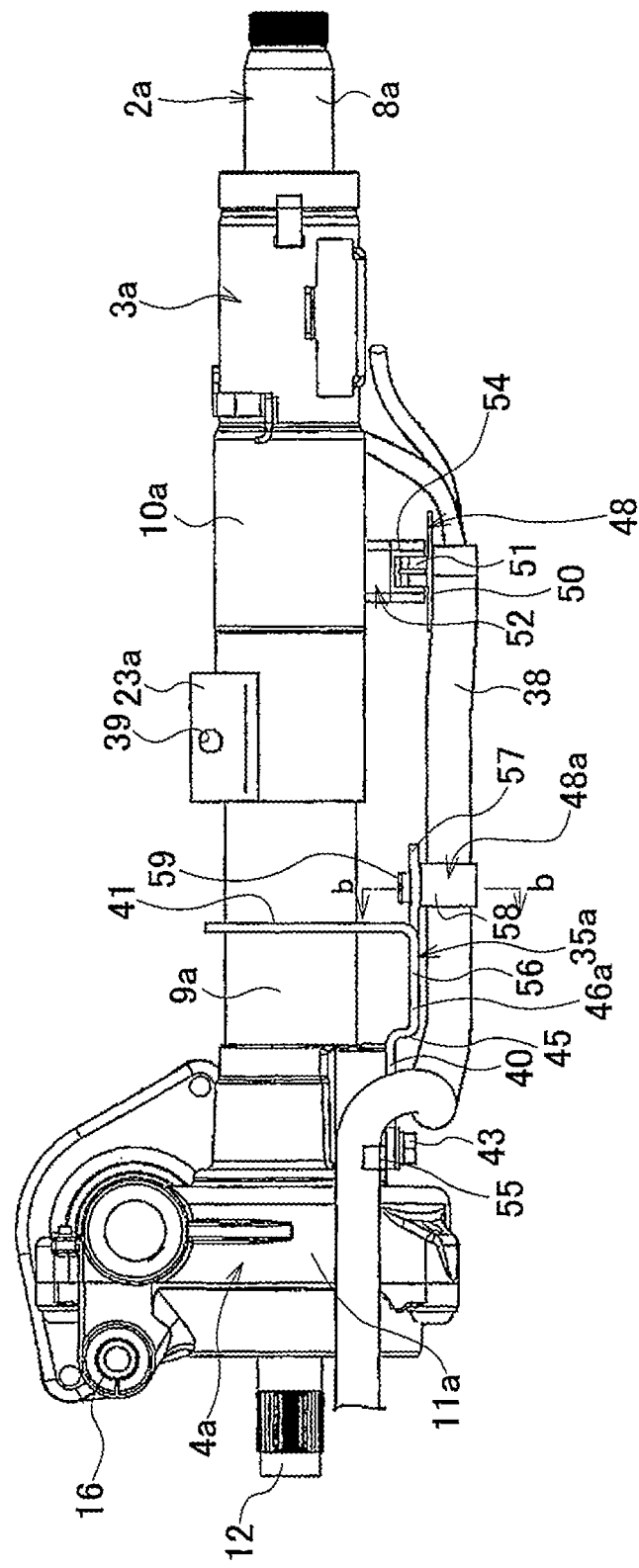
FIG. 10 is a side view of a second example of an embodiment of the present invention as seen from the left of a state in which part of the members have been omitted.
Figure 11:
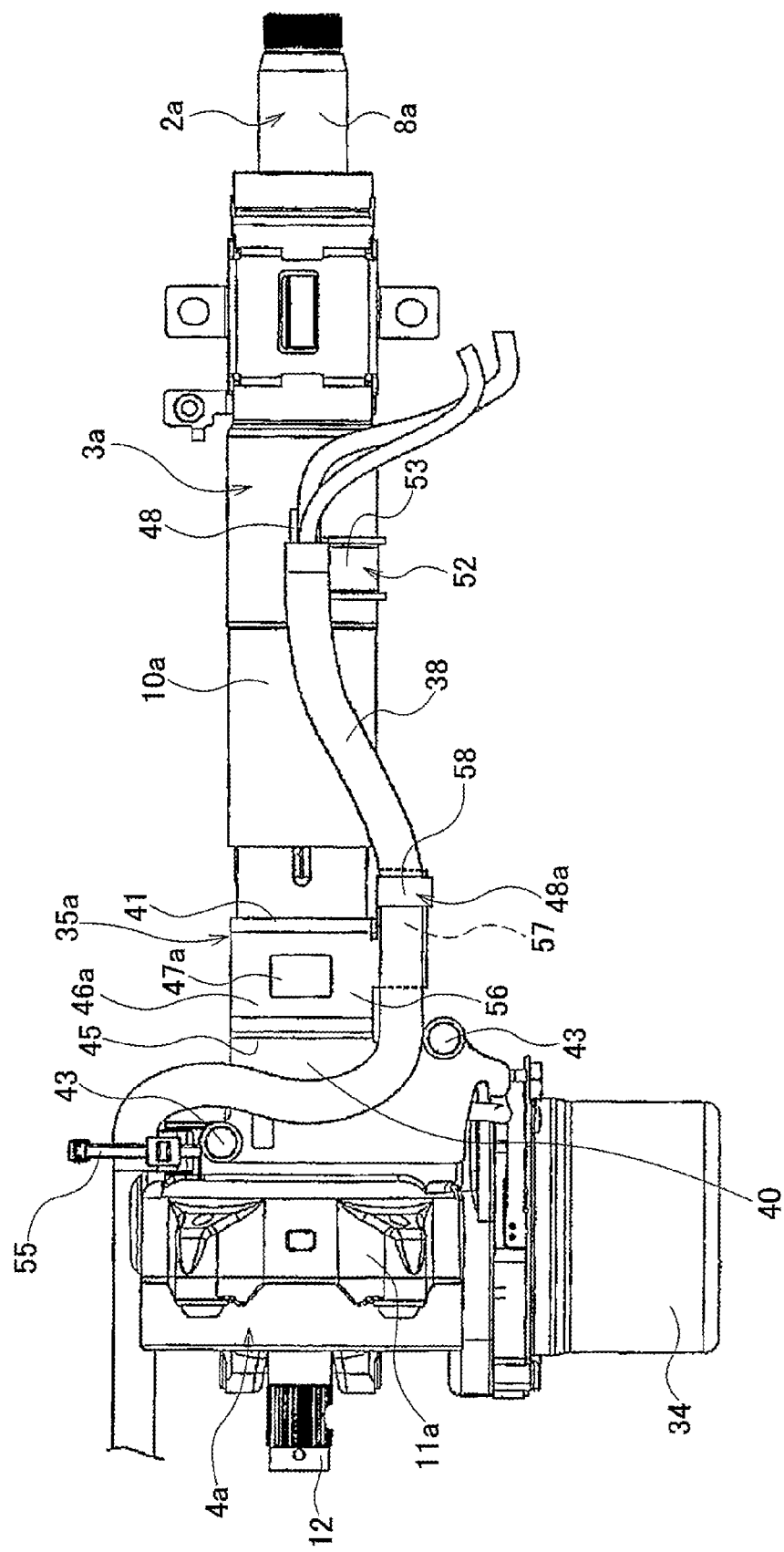
FIG. 11 is a view as seen from underneath in FIG. 10.
Figure 12A:
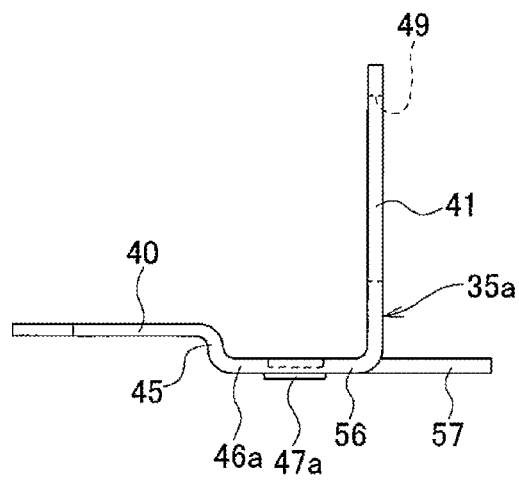
FIG. 12A is a right side view of an energy-absorbing member of the second example.
Figure 12B:
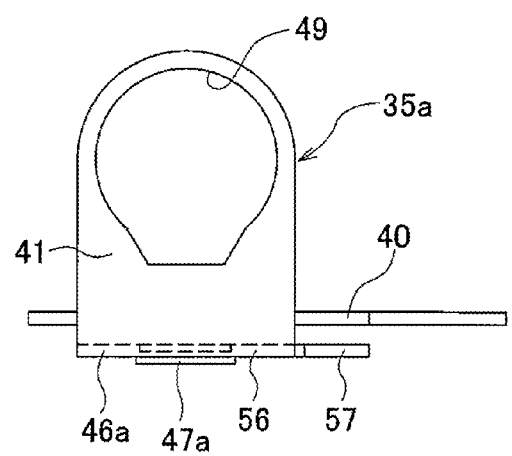
FIG. 12B is a view as seen from the right in FIG. 12A.
Figure 12C:
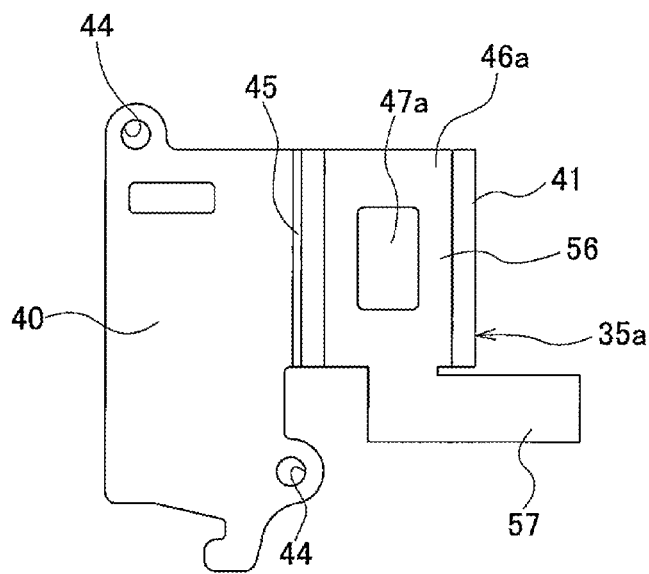
FIG. 12C is a view as seen from underneath in FIG. 12A.
Figure 13:
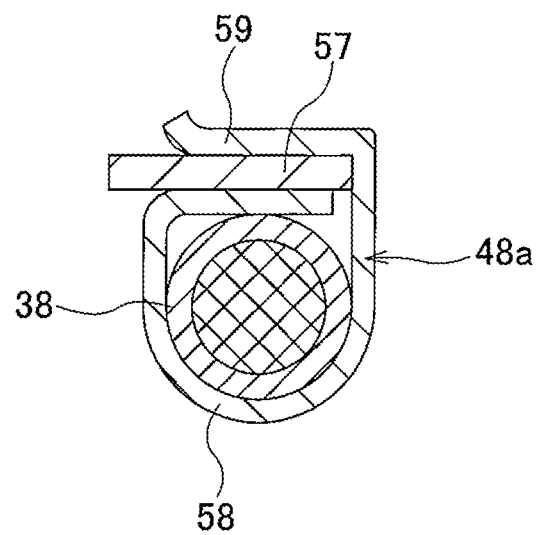
FIG. 13 is an enlarged cross-sectional view of section b-b in FIG. 10.

In this example, the structure related to the position adjustment function of the steering wheel 1 is such that the supported bracket 23*a* is welded and fastened to the top surface of the front-end section of the outer column 10*a*. Moreover, instead of the through holes that are formed in the left and right sidewalls of the supported bracket 23*a* for inserting the adjustment rod 26*a* being forward-backward long holes, the holes are simple circular holes 39 as illustrated in FIG. 6.

Therefore, in this example, it is not possible to adjust the forward-backward position of the steering wheel 1. Furthermore, there are some small differences such as providing a cam apparatus between the inside surface of the base-end section of the adjustment lever 29a and the outside surface of one of the sidewall sections 18a of the rear support bracket 17a, however, they are all conventionally known, and are not a feature of this example. However, the present invention can be applied to steering apparatuses having various structures, regardless of whether or not there is a position adjustment function for the steering wheel (function for adjusting at least one of the up-down position and forward-backward position).

The energy-absorbing member 35 is installed at a position that bridges the connection between the inner column (front column) 9a of the steering column 3a and the gear housing 11a of the steering force auxiliary apparatus 4a. In this example, the energy-absorbing member 35 is formed into one piece using plastically deformable metal plate such as mild steel plate, thermoplastic engineering plastic such as polyacetal (POM) or polyamide (PA), or reinforced plastic having polyacetal (POM) or polyamide (PA) as raw material to which a filler such as carbon fiber or glass fiber has been added, and has a base plate section 40 and a pressed plate section 41 that are provided so as to be separated from each other in the forward-backward direction, and a connecting plate section 42 that connects the edges of the ends of the base plate section 40 and the pressed plate section 41. The base plate section 40 is a long rectangular part that is long in the left-right direction. As illustrated in FIGS. 7A to 7C, through holes 44 through which bolts 43 are inserted in order to support and fasten the base plate section 40 to the gear housing 11a are formed at two locations in diagonal positions of the base plate section 40. Moreover, the connecting plate section 42 has a downward hanging plate section 45 that is bent downward at a right angle from the edge on the rear end of one half in the width direction of the base plate section 40 (the left half in the width direction in the example in the figure), and an extending support plate section 46 that is bent toward the rear at a right angle from the edge on the bottom end of the downward hanging plate section 45. Stamping press is performed on the center portion in the forward-backward direction of both end sections in the width direction of the support plate section 46, and rectangular reinforcing ribs 47 are formed by offsetting that portion downward from the other portions to create a stepped section that surrounds that portion, which increases the bending rigidity of the support plate section 46. At the same time that these reinforcing ribs 47 are being formed, the plate thickness of the reinforcement ribs 47 is adjusted in order match the held thickness by a clip 48 for supporting a cable 38 by the support plate section 46. Moreover, the pressed plate section 41 is bent upward at a right angle from the edge on rear end of the support plate section 46 and extends. A circular through hole 49 for a column is formed in the portion near the top end of the pressed plate section 41.

In order to install the energy-absorbing member 35 in a state that bridges the connecting section between the inner column 9a and the gear housing 11a, the base plate section 40 is connected and fastened to the bottom surface of the rear-end section of the gear housing 11a by bolts 43 that are inserted through the through holes 44, and the portion near the front end of the inner column 9a is loosely inserted into the through hole 49 for a column that is provided in the pressed plate section 41. In this example, the inner column 9a corresponds to one column, and the gear housing 11a corresponds to a portion that is fastened to this one column. Particularly in this example, in this state, the dimension and installation position of each part on the top end side are regulated so that a space in the radial direction of about 2 mm to 3 mm is formed between the inner circumferential edge of the through hole 49 for a column and the outer circumferential surface of the inner column 9a. By assembling the energy-absorbing member 35 in this way, the support plate section 46 is arranged underneath the front-end section of the inner column and runs along the inner column 9a, and the surface on the top side of the support plate section 46 is made to face the bottom surface of the front-end section of the inner column 9a. Furthermore, the portion of the rear surface of the pressed plate section 41 that surrounds the through hole 49 for the column is made to face the edge on the front end of the outer column 10a through a specified space in the axial direction.

Moreover, the cable 38 includes plural power lines, signal lines and the like that are bundled in a cable harness which is covered by an insulating material, with the rear-end section thereof connected to electric equipment such as a steering lock apparatus 36, combination switch 37 and the like by a connector (not illustrated in the figure). In this example, the cable 38 such as this is arranged in the forward-backward direction along the bottom surface of the steering column 3a, and two portions of the cable 38 that are separated in the axial direction are supported by cable support brackets 52 that are supported by the energy-absorbing member 35 and the outer column 10a.

Part of the middle section of the cable 38 is supported on the support plate section 46 of the energy-absorbing member 35 by the clip 48. The clip 48 is made into one piece using metal plate such as steel plate, or a thermoplastic engineering plastic having sufficient spring properties, and has a band-shaped base section 50 that has a specified length dimension, and a pair of holding plate sections 51 that are bent to one side in the thickness direction (width direction) of the base section 50 from the both edges in the width direction (vertical direction) of the middle section in the length direction of the base section 50. In the free state, the space between the tip end sections of these holding plate sections 51 becomes less than the thickness dimension of the pair of reinforcing ribs 47 that are formed on the support plate section 46. The side surface of the base section 50 of the clip 48 is fastened along the length direction to the side surface of the cable 38 using a method such as adhesive, or band tightening or the like. In this state, as illustrated in FIG. 8, one of the reinforcing ribs 47 of the support plate section 46 is inserted between the pair of holding plate sections 51 of the clip 48 while elastically expanding the space between the holding plate sections 51. As a result, the top and bottom surfaces of the reinforcing rib 47 and the inside surfaces of the pair of holding plate sections 51 engage frictionally by a strong force due to the elastic force of the holding plate sections 51.

Part of the rear-end section of the cable 38 (in the example illustrated in the figure, the rear-end part of the portion (cable harness) where the cables are collected into one by an outer layer made of a simple insulating material) is supported by the cable support bracket 52 that is fastened to the bottom surface of the middle section of the outer column 10a by a similar clip 48. The cable support bracket 52 is made of a metal plate such as a steel plate, and has a partial cylindrical base section 53 that is fastened to the side surface on the bottom section of the middle section of the outer column 10a by welding or adhesive, and a rectangular protruding section 54 that is bent downward from the edge of the bottom end of the base section 53, and protrudes downward from the bottom surface in the middle section of the outer column 10a. The side surface of the base section 50 of the clip 48 is fastened over the length direction to the top surface of the cable 38 by a method such as adhesive, band tightening or the like. In this state, the protruding section 54 is inserted between the pair of holding plate sections 51 of the clip 48 while elastically widening the space between these holding plate sections 51. As a result, the side surfaces of both sides of the protruding section 54 and the inside surfaces of the pair of holding plate sections 51 engage frictionally by a strong force due to the elastic force of these holding plate sections 51. Alternatively, a structure in which the cable support bracket is fastened to the rear support bracket or part of the electric equipment such as a key lock apparatus, which corresponds to a portion that is fastened to the outer column, or the cable support bracket is integrated with the electric equipment, can be adopted.

Of the middle section of the cable 38, the portion that is adjacent to the front-end side of the portion of the energy-absorbing member 35 that is supported by the support plate section 46 is bent toward one side in the width direction (in the example in the figure, toward the left side in the width direction), and the portion on the tip-end side of this portion that is bent toward one side is further bent toward the front. The base-end section (rear-end section) of this portion that is bent toward the front is supported in a caught state by the top of another cable support bracket 55 that projects from the portion near the rear end of the bottom section of one side surface (in the example in the figure, the left side surface) of the gear housing 11*a*.

In the case of the impact absorbing steering apparatus of this example, the outer column 10*a* and the rear support bracket 17*a* that is detached from the vehicle body 13 due to forward displacement of the steering wheel 1 during a secondary collision displaces in the forward direction with respect to the inner column 9*a*. In this example, the outer column 10*a* corresponds to the other column, and the rear support bracket 17*a* corresponds to a portion that is fastened to the other column. As displacement of the outer column 10*a* and the rear support bracket 17*a* proceeds, the portion of the surface on the rear side of the pressed plate section 41 of the energy-absorbing member 35 that surrounds the through hole 49 for a column is pressed by the edge of the front end of the outer column 10*a*. As a result, the energy-absorbing member 35 plastically deforms as the pressed plate section 41 displaces in the forward direction along the inner column 9*a*. In the initial stage of this plastic deformation, as illustrated in order in FIG. 6 and FIG. 9, the support plate section 46 of the energy-absorbing member 35 deforms so as to bend into a U shape or V shape, and the reinforcing rib 47 that supports the cable 38 displaces downward. More specifically, in the initial stage of the plastic deformation of the energy-absorbing member 35 during a secondary collision, as the pressed plate section 41 is displaced toward the front, the pressed plate section 41 bends, portions of the support plate section 46 that are not provided with the reinforcing ribs 47 bend, the support plate section 46 and the downward hanging plate section 45 pivot around the connecting sections between the pressed plate section 41, the support plate sections 46, the downward hanging plate section 45 and the base plate section 40, and the energy-absorbing member 35 plastically deforms. During this plastic deformation, the support plate section 46 pivots around the connecting section between the support plate section 46, which is the end section on the base plate section 40 side, and the downward hanging plate section 45, and the connecting section between the support plate section 46, which is the end section on the opposite side from the base plate section 40, and the pressed plate section 41 pivots outward in the radial direction of the steering column 3*a*, or in other words, pivots downward, and the reinforcing ribs 47 that are provided on the support plate section 46 displace downward. In this example, when this occurs, the pressed plate section 41 displaces downward only the amount of the space in the radial direction that exists between the inner circumferential edge of the through hole 49 for a column and the outer circumferential surface of the inner column 9*a*. As a result, downward displacement of the reinforcing ribs 47 is promoted.

In this example, by forming a pair of reinforcing ribs 47 in the support plate section 46, the bending rigidity of the support plate section 46 is increased in the portion where the reinforcing ribs 47 are provided. Therefore, in the initial stage of plastic deformation, the amount that the portion of the support plate section 46 that is held by the clip 48 bends downward in a direction so as to become convex is suppressed. Moreover, in this example, the reinforcing ribs 47 are formed so as to be symmetrical on the left and right with respect to the support plate section 46. Therefore, deformation of the support plate section 46 in a twisting direction around the forward-backward axis is also prevented. As a result, in this example, in the initial state of plastic deformation, downward displacement of the reinforcing ribs 47 that are formed in the support plate section 46 can be performed smoothly.

In any case, in this example, as the reinforcing ribs 47 of the support plate section 46 that are held by the clip 48 displace downward, the middle section of the cable 38 that is supported by the reinforcing ribs 47 is pulled by the reinforcing ribs 47 and displaces downward. Therefore, after that, by the outer column 10*a* displacing in the forward direction further than the state illustrated in FIG. 9, the portion located between the middle section and the rear-end section of the cable 38 is prevented from tightening or stiffening in the axial direction and acting like a stopper rod even when the space in the axial direction between the support plate section 46 of the energy-absorbing member 35 that supports the middle section of the cable 38 and the cable support bracket 52 that supports the rear end section of the cable has decreased. In other words, the cable that is supported by this portion is suppressed from becoming a resistance against the displacement of the steering wheel 1 in the forward direction during a secondary collision. As a result, the ability to absorb impact due by the plastic deformation of the energy-absorbing member 35 can be achieved with good efficiency.

In this example, the support plate section 46 and the middle section of the cable 38 displace in the downward direction during a secondary collision, however, these parts are located between both knees of the driver in the width direction of the vehicle, so there is no problem with these parts colliding with the knees of the driver. Moreover, in this example, the energy-absorbing member 35 is used as a cable support member for supporting the middle section of the cable 38, so it is possible to reduce costs by sharing the use of parts.

Furthermore, in this example, in the normal state a specified space in the axial direction is provided between the pressed plate section 41 of the energy-absorbing member 35 and the site that presses the pressed plate section 41 when a secondary collision occurs. However, a structure in which the pressed plate section 41 and the site that presses the pressed plate section 41 are in contact or are connected beforehand can be also adopted. By using the structure such as this, it is possible to cause plastic deformation of the energy-absorbing member 35 immediately after a secondary collision occurs. As a result, it is possible to more sufficiently suppress or prevent the middle section of the cable 38 from becoming a resistance against the forward displacement of the steering wheel 1 during a secondary collision. Moreover, the site that presses the pressed plate section 41 is not limited to the end section of the outer column 10a, and could be the end section of the portion that is fastened to the outer column 10a such as the rear support bracket 17a or supported bracket 23a that is fastened to the outer column (other column). In addition, depending on the structure of the steering column, the location of the energy-absorbing member 35 could also be on the top or on the side.

Furthermore, in this example, the front column is taken to be the inner column, and the rear column is taken to be the outer column. However, the present invention can be applied even when the front column is taken to be the outer column and the rear column is taken to be the inner column. In that case, for example, the base plate section of the energy-absorbing member is fastened to the inner column, which is the rear column, or fastened to a portion that is fastened to the inner column, and the pressed plate section of the energy-absorbing member is located further on the front side than the base plate section. When a secondary collision occurs, the pressed plate section is pressed toward the rear by the outer column, which is the front column, or a portion that is fastened to the outer column.

Second Example

FIG. 10 to FIG. 13 illustrate a second example of an embodiment of the present invention. In this example, the support plate section 46a of the connecting plate section 42a of the energy-absorbing member 35a is formed by connecting together a rectangular main support plate section 56 that is provided on one side in the width direction of the portion between the edge on the bottom end of the downward hanging section 45 and the end on the bottom end of the pressed plate section 41 (in the example in the figures, the left side in the width direction) and a long band-shaped extending section 57 that is long in the forward-backward direction and that is provided so as to be adjacent to the other side in the width direction of the main support plate section 56 (in the example in the figures, the right side in the width direction). In this example, stamping press is performed on the center portion of the main support plate section 56, and by making that center portion to be offset more than the other portions and creating a stepped section surrounding that center section, a rectangular reinforcing rib 47 is formed. Moreover, the rear-end section of the extending section 57 is located further toward the rear than the main support plate section 56. The pressed plate section 41 is bent at a right angle upward from the rear-end edge of the main support plate section 56, which is the rear-end edge of at least part in the width direction of the support plate section 46a.

Furthermore, in this example, part of the middle section of the cable 38, which is the portion on the front side of two portions that are separated in the axial direction of the cable 38 and that are arranged underneath the steering column 3a, is supported by the rear-end section of the extending section 57 by using the clip 48. The clip 48 is formed into one piece using metal plate such as steel plate having sufficient spring characteristics, or a thermoplastic engineering plastic, and has a cylindrical shaped holding section 58 and a pressure plate section 59. The holding section 58 fits around part of the middle section of the cable 38. Moreover, the rear-end section of the extending section 57 is inserted between the top surface of the holding section 58 and the bottom surface of the pressure plate section 59 while elastically expanding the space between these top and bottom surfaces.

Even in the case of the impact absorbing steering apparatus of this example, in the initial stage as the energy-absorbing member 35a plastically deforms when the steering wheel 1 displaces in the forward direction during a secondary collision, the support plate section 46a (the main support plate section 56 and the extending section 57) pivot and displace downward as the rear-end section thereof inclines downward. As a result, the middle section of the cable 38 that is supported by the rear-end section of the extending section 57 also displaces downward as the extending section 57 inclines in the same direction. The configuration and functions of the other parts are the same as in the first example of an embodiment.

Third Example

Figure 14:
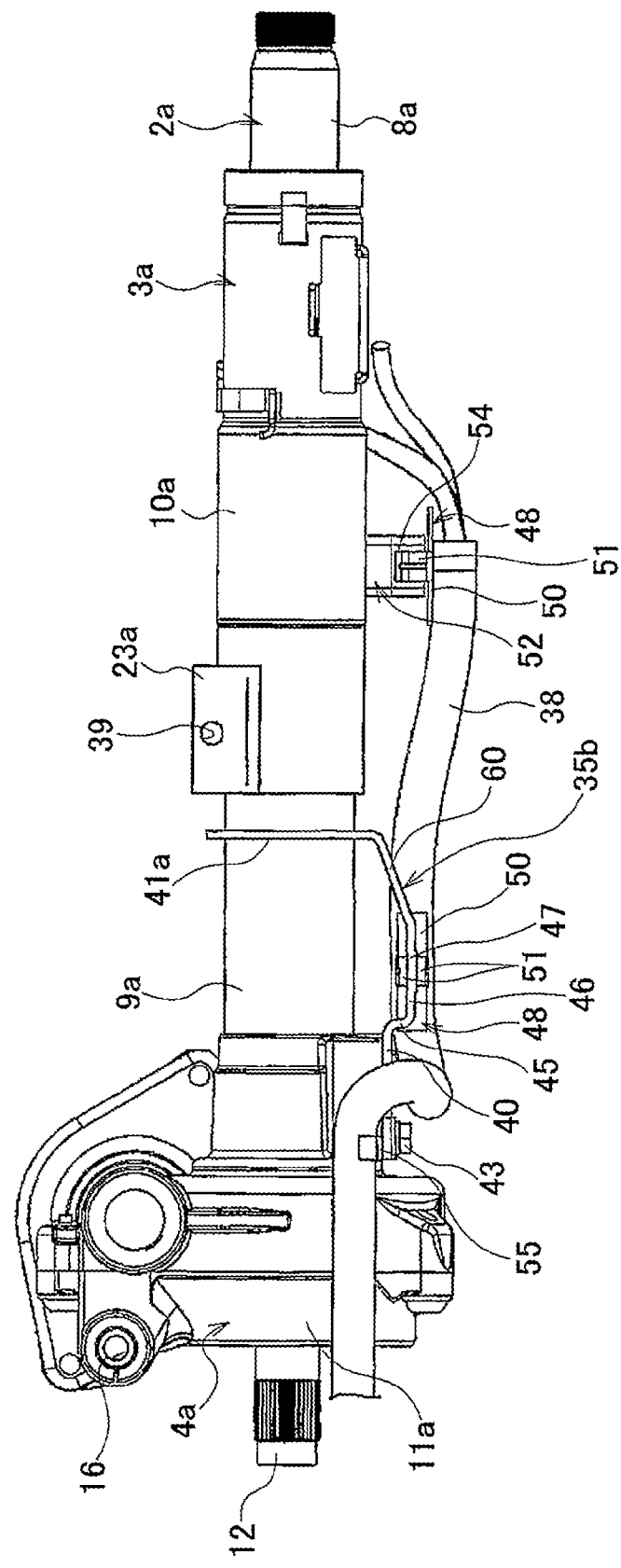
FIG. 14 is a side view of a third example of an embodiment of the present invention as seen from the left in a state in which part of the members have been omitted.
Figure 15:
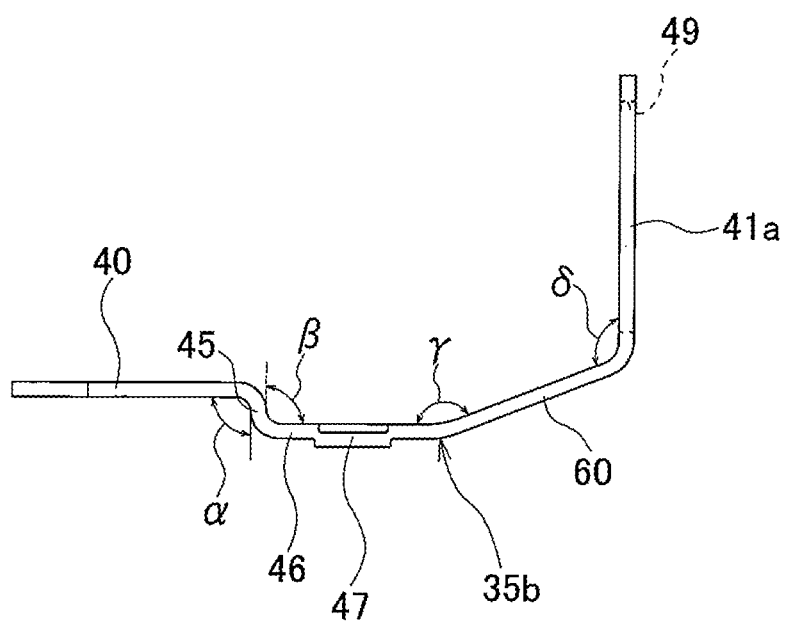
FIG. 15 is a left side view of an energy-absorbing member of the third example.
Figure 16:
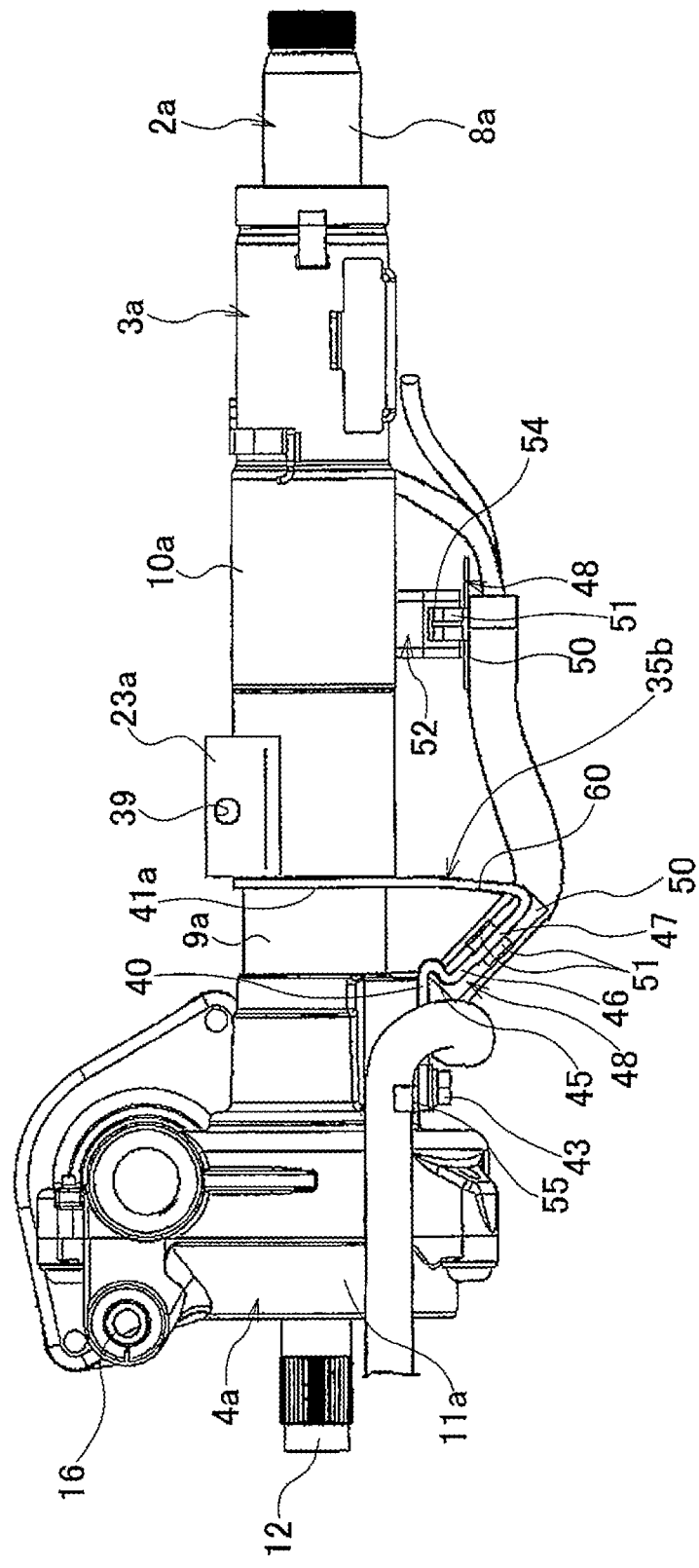
FIG. 16 is a drawing similar to FIG. 14 and illustrates the third example in a state in which the outer column has displaced forward due to a secondary collision.

FIG. 14 to FIG. 16 illustrate a third example of an embodiment of the present invention. In this example, the energy-absorbing member 35b has a flat pivoting plate section 60 that is located between the rear-end section of the support plate section 46 and the edge on the bottom end of the pressed plate section 41a, and is inclined in an upward direction going toward the rear. In this example, in the initial state of plastic deformation of the energy-absorbing member 35b that occurs during a secondary collision, the support plate section 46 pivots and displaces downward as the rear-end section thereof inclines downward as illustrated in order in FIG. 14 and FIG. 16. In other words, in the initial stage of plastic deformation, as the pressed plate section 41a displaces in the forward direction, the connections between the base plate section 40, the downward hanging plate section 45, the support plate section 46, the pivoting plate section 60 and the pressed plate section 41a plastically deform in a direction such that the angle α between the surface on the bottom side of the base plate section 40 of the energy-absorbing member 35b and the surface on the front side of the downward hanging plate section 45 (FIG. 15), the angle β between the surface on the rear side of the downward hanging section 45 and the surface on the top side of the support plate section 46 (FIG. 15), and the angle γ between the surface on the top side of the support plate section 46 and the surface on the top side of the pivoting plate section 60 (FIG. 15) are reduced, and the angle δ between the surface on the top side of the pivoting plate section 60 and the surface on the front side of the pressed plate section 41a is increased. As this occurs, the support plate section 46 pivots and displaces downward as the rear-end section thereof inclines downward. As a result, the middle section of the cable 38 that is supported by the support plate section 46 also displaces downward while inclining in the same direction as the support plate section 46.

Particularly, in this example, the pivoting plate section 60 is provided in the energy-absorbing member 35b, so the energy-absorbing member 35b plastically deforms so that the pivoting plate section 60 and the support plate section 46 are folded. Therefore, it is possible for the support plate section 46 to pivotally incline smoothly without bending in a direction so as to become convex in a downward direction. Moreover, in this example, the space in the axial direction between the surface on the rear end of the pressed plate section 41a and the edge on the front end of the outer column 10a is shorter by the amount of the pivoting plate section 60 in a normal condition. Therefore, it is possible to quickly cause the support plate section 46 and the middle section of the cable 38 to pivotally incline in the downward direction after a secondary collision occurs. Consequently, the middle section of the cable 38 is sufficiently suppressed or prevented from becoming a resistance against the displacement in the forward direction of the steering wheel 1 during a secondary collision. The configuration and functions of other parts are the same as in the first example of an embodiment.

In the case of the structure of this example, it is possible to form a reinforcing section in the pivoting plate section 60. Moreover in the case of embodying the present invention, it is also possible to employ the structure in which a pivoting plate section that is inclined upward going toward the rear between the edge on the rear end of the main support plate section of the energy-absorbing member 35*a* and the edge on the bottom end of the pressed plate 41 is added to the structure of the second example of an embodiment that is illustrated in FIG. 10 to FIG. 13.

Fourth Example

Figure 17:
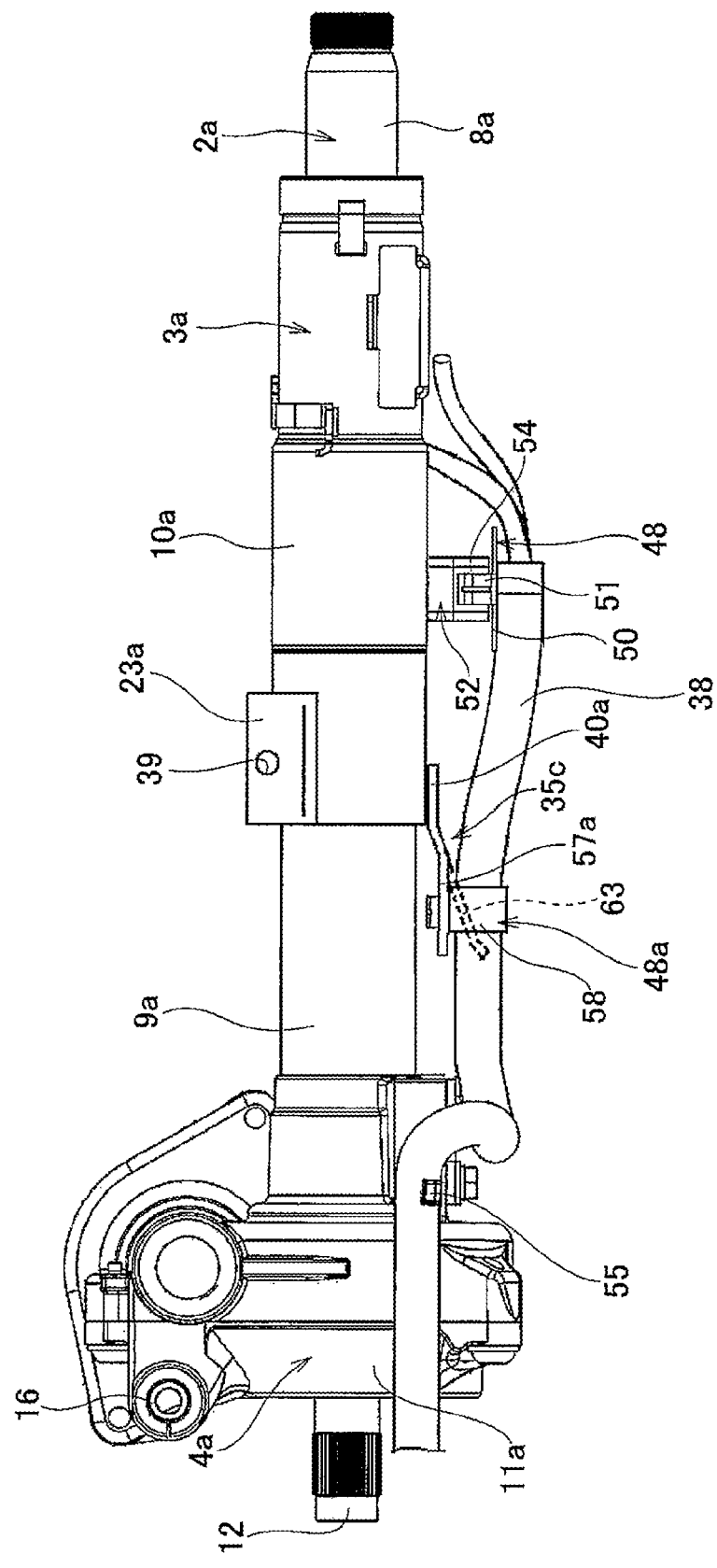
FIG. 17 is a side view of a fourth example of an embodiment of the present invention as seen from the left in a state in which part of the members are omitted.
Figure 18:
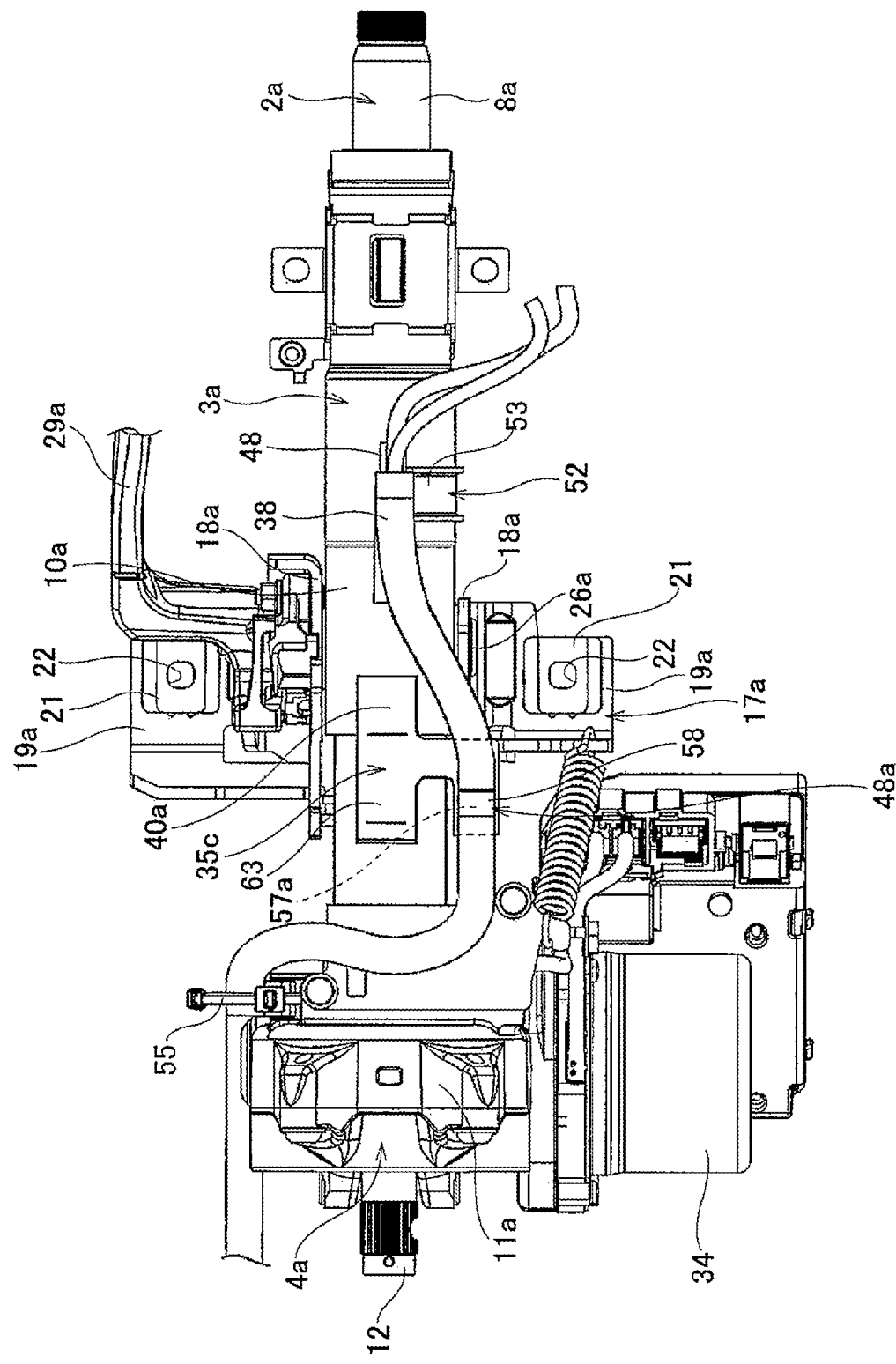
FIG. 18 is a bottom view of the fourth example as seen from underneath.

FIG. 17 and FIG. 18 illustrate a fourth example of an embodiment of the present invention. In this example, the energy-absorbing member 35*c* includes the base plate section 40*a*, an inclined plate section 63 and an extending section 57*a*. The base plate section 40*a* is supported by and fastened to the bottom surface of the front-end section of the outer column 10*a*, which corresponds to a rear column, by welding, adhesive, screws, crimping or the like. Moreover, the inclined plate section 63 functions as a pressed plate section, and extending from the edge on the front end of the base plate section 40*a*, the inclined plate section 63 is inclined downward going toward the front. In other words, in this example, the pressed plate section is adjacent to the base plate section, and directly connected to the base plate section. Moreover, the extending section 57*a* has a long band shape that is long in the forward-backward direction, functions as a support plate section, and is provided in a portion that is adjacent to the one side in the width direction of the inclined plate section 63 (in the example in the figure, the right side in the width direction) so as to be able to pivotally displace in synchronization with the inclined plate section 63. In other words, in this example, the support plate section is directly connected to only the pressed plate section. The extending section 57*a* supports the part of the middle section of the cable 38 that is on the front side of two portions that are separated in the axial direction of the cable 38 by way of the clip 48*a*.

In this example, as the outer column 10*a* displaces in the forward direction during a secondary collision, the front-end section of the surface on the top side of the inclined plate section 63 collides with the surface on the rear side of the gear housing 11*a* that is supported by the front-end section of the inner column 9*a*. Furthermore, as the secondary collision proceeds and the surface on the rear side of the gear housing 11*a* presses the front-end section of the surface on the top side of the inclined plate section 63, the inclined plate section 63 is pivoted such that the front side of the inclined plate section 63 is further pivoted in a downward direction (counterclockwise direction in FIG. 18), and the portion of the surface on the top side of the inclined plate section 63 (the surface that faces the front due to inclination) that is pressed by the surface on the rear side of the gear housing 11*a* moves in the backward direction (base plate section 40*a* side). In other words, as the secondary collision proceeds, the inclination angle of the inclined plate section 63 increases, and the front side of the extending section 57*a* that is provided adjacent to the inclined plate section 63 pivots and inclines in a downward direction. As a result, the middle section of the cable 38 that is supported by the extending section 57*a* also displaces downward while inclining in the same direction as the extending section 57*a*. The configuration and functions of the other parts are the same as in the first to third examples of an embodiment.

Fifth Example

Figure 19:
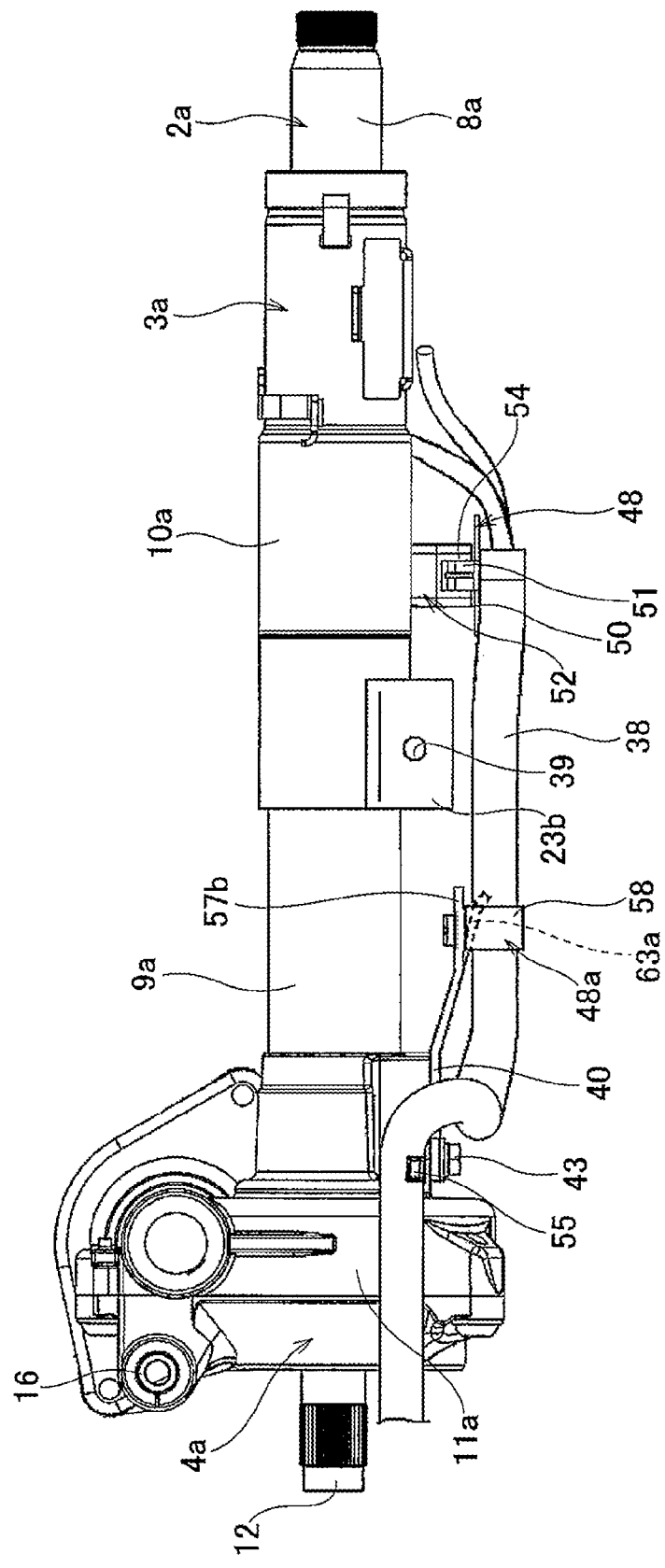
FIG. 19 is a side view of a fifth example of an embodiment of the present invention as seen from the left in a state in which part of the members have been omitted.
Figure 20:
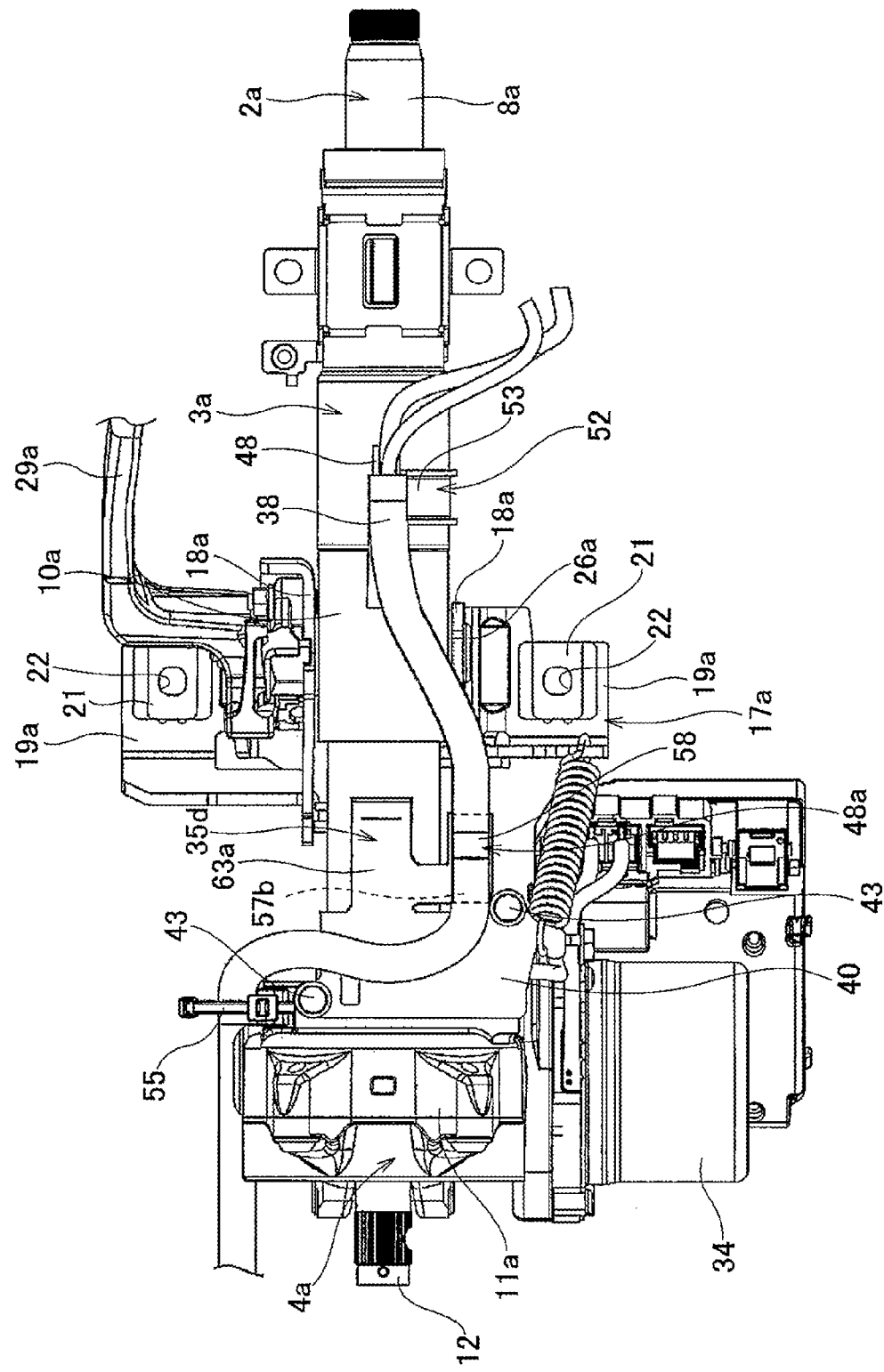
FIG. 20 is a bottom view of the fifth example as seen from underneath.

FIG. 19 and FIG. 20 illustrate a fifth example of an embodiment of the present invention. In this example, the base plate section 40 of the energy-absorbing member 35*d* is supported by and fastened to the bottom surface of the gear housing 11*a* that is supported by the front-end section of the inner column 9*a*. An inclined plate section 63*a* that is inclined in a downward direction going toward the rear is provided so as to extend from one position in the width direction of the edge on the rear end of the base plate section 40. A long band-shaped extending section 57*b* that is long in the forward-backward direction is provided in the portion adjacent to one side in the width direction of the inclined plate section 63*a* (In the example in the figure, the right side in the width direction) so as to be able to pivotally displace in synchronization with the inclined plate section 63*a*. In other words, in this example as well, the inclined plate section 63*a* that corresponds to a pressed plate section is adjacent to and directly connected to the base plate section 40. Moreover, the extending section 57*b* that corresponds to a support plate section is directly connected only to the inclined plate section 63*a* that corresponds to a pressed plate section.

In this example, as the outer column 10*a* displaces in the forward direction during a secondary collision, the rear-end section of the surface on the top side of the inclined plate section 63*a* collides with the surface on the front side of a support bracket 23*b* that is welded and fastened to the bottom surface of the front-end section of the outer column 10*a*. Furthermore, as the secondary collision proceeds, the surface on the front side of the support bracket 23*b* presses the rear-end section of the surface on the top side of the inclined plate section 63*a*, which causes the rear side of the inclined plate section 63*a* to further pivot in the downward direction (clockwise direction in FIG. 20), and the portion of the surface on the top side of the inclined plate section 63*a* (portion that faces to the rear side as inclination proceeds) that is pressed by the surface on the front side of the support bracket 23*b* moves toward the front (base plate section 40 side). As this occurs, the rear side of the extending section 57*b* pivots and inclines in the downward direction, and the middle section of the cable 38 that is supported by the extending section 57*b* also displaces downward while inclining in the same direction as the extending section 57*b*. The configuration and functions of the other parts are the same as in the first through the fourth examples of an embodiment.

Figure 21A:
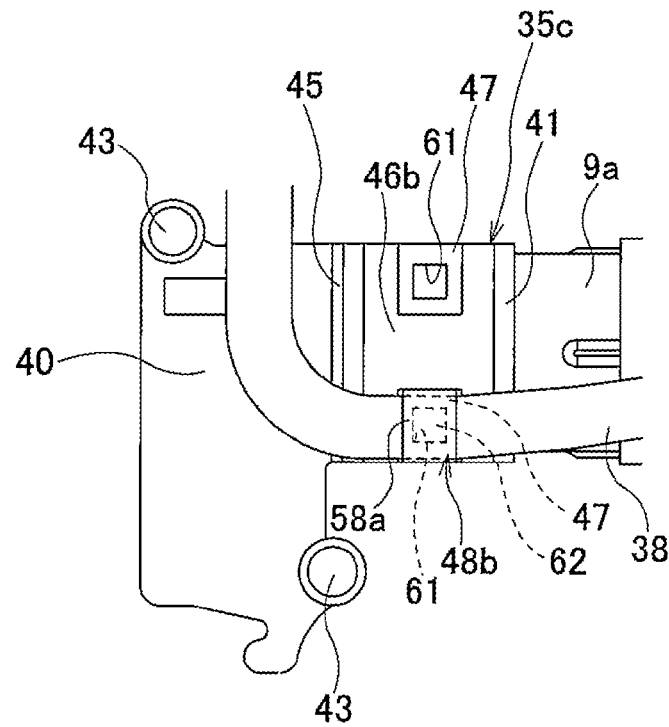
FIGS. 21A and 21B are bottom views of another two examples having structures that support the middle section of a cable to the energy-absorbing member that can be applied to the present invention by using a clip.
Figure 21B:
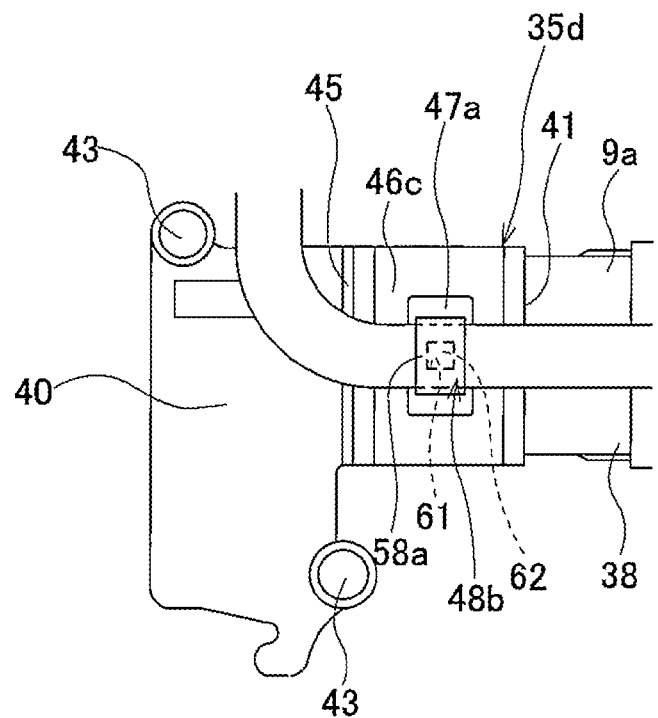

Moreover, when implementing any of the examples of an embodiment of the present invention, various kinds of clips, including known clips, can be used as the clip that is used for supporting the middle section of the cable with respect to the support plate section of the energy-absorbing member. For example, as illustrated in FIGS. 21A and 21B, engaging holes 61 are formed in the portion of the support plate section 46*b*, 46*c* of the energy-absorbing member 35*c*, 35*d* (the center sections of the left and right reinforcing ribs 47 in the example illustrated in FIG. 21A, and the center section of the reinforcing rib 47*a* that is provided in the center section in the example illustrated in FIG. 21B), and as the clip 48*b*, a clip is used that has a holding section 58*a* that fits around the middle section of the cable 38 and holds that middle section, and an engaging section 62 that can engage with or disengage from the engaging hole 61.

EXPLANATION OF REFERENCE NUMBERS

1 Steering wheel
2, 2*a* Steering shaft
3, 3*a* Steering column
4, 4*a* Steering force auxiliary apparatus
5 Tie rod
6 Steering gear unit 7 Inner shaft
8, 8a Outer shaft
9, 9a Inner column
10, 10a Outer column
11, 11a Gear housing
12 Output shaft
13 Vehicle body
14 Tilt pivot shaft
15 Front support bracket
16 Support cylinder
17, 17a Rear support bracket
18, 18a Sidewall section
19, 19a Installation plate section
20 Notch
21 Capsule
22 Through hole
23, 23a Supported bracket
24 Forward-backward long hole
25 Up-down long hole
26, 26a Adjustment rod
27 Adjustment nut
28 Head section
29, 29a Adjustment lever
30 Universal joint
31 Intermediate shaft
32 Universal joint
33 Input shaft
34 Electric motor
35, 35a, to 35d Energy-absorbing member
36 Steering lock apparatus
37 Combination switch
38 Cable
39 Circular hole
40 Base plate section
41, 41a Pressed plate section
42, 42a Connecting plate section
43 Bolt
44 Through hole
45 Downward hanging plate section
46, 46a to 46c Support plate section
47, 47a Reinforcing rib
48, 48a, 48b Clip
49 Through hole for a column
50 Base section
51 Holding plate section
52 Cable support bracket
53 Base section
54 Protruding section
55 Cable support bracket
56 Main support plate section
57, 57a, 57b Extending section
58, 58a Holding section
59 Pressure plate section
60 Pivoting plate section
61 Engaging hole
62 Engaging section
63, 63a Inclined plate section

What is claimed is:

1. An impact absorbing steering apparatus, comprising:
a steering column that has a front column that is located on a front side with its movement in a forward-backward direction regulated, and a rear column that is combined with a rear-end section of the front column so as to be able to displace in an axial direction thereof, and supports a steering shaft, to an end section of which a steering wheel can be fastened, so as to be able to rotate freely on an inside thereof; and
an energy-absorbing member that comprises: a base plate section that is fastened to one column of either the front column or the rear column or to a portion that is fastened to the one column; a pressed plate section that is separated from or adjacent to the base plate section in the axial direction of the steering column and is indirectly or directly connected to the base plate section, and that is pressed by the other column of either the front column or the rear column or a portion that is fastened to the other column due to displacement in a forward direction of the rear column during a secondary collision; and a support plate section that is located along the steering column and is indirectly or directly connected to the pressed plate section, or both the base plate section and the pressed plate section, at least part of the support plate section displacing toward an outside in a radial direction of the steering column when the pressed plate section is pressed during a secondary collision; and part of the energy-absorbing member plastically deforming by the pressed plate section being pressed during a secondary collision, and absorbing impact energy that is applied to the rear column from the steering wheel, and
the support plate section supporting one of two portions of a cable that is connected to electric equipment that is fastened to a rear end section of the rear column and is arranged in the forward-backward direction along the steering column, the two portions being separated in the axial direction of the steering column, and the rear column supporting the other of the two portions.

2. The impact absorbing steering apparatus according to claim 1, wherein, by the pressed plate section being pressed during a secondary collision, an end section of the support plate section that is on an opposite side from the base plate section pivots in a direction toward the outside in the radial direction of the steering column around an end section of the support plate section that is on the base plate section side.

3. The impact absorbing steering apparatus according to claim 1, wherein the energy-absorbing member is arranged so that a top surface of the support plate section faces a bottom surface of the steering column.

4. The impact absorbing steering apparatus according to claim 1, wherein a reinforcing section is provided in a portion of the support plate section and a bending rigidity of the portion where the reinforcing section is provided is improved.

5. The impact absorbing steering apparatus according to claim 4, wherein the reinforcing section comprises a reinforcing rib that is formed by plastically deforming part of the support plate section by a stamping press process.

6. The impact absorbing steering apparatus according to claim 1, further comprising
a downward hanging plate section that is bent downward from an end edge of the base plate section, wherein
the support plate section bends and extends from a bottom end edge of the downward hanging plate section in an opposite direction from the base plate section, and
the pressed plate section bends and extends upward from at least one portion in a width direction of an end edge of the support plate section on an opposite side from the base plate section.

7. The impact absorbing steering apparatus according to claim 6, wherein the support plate section further comprises an extending section located in a portion that is adjacent in the width direction to a portion that connects the base plate section and the pressed plate section and extending in the forward-backward direction, and wherein the extending section supports the one of the two portions of the cable that are separated in the axial direction.

8. The impact absorbing steering apparatus according to claim 1, further comprising:
- a downward hanging plate section that is bent downward from an end edge of the base plate section; and
- a pivoting plate section that is located between the support plate section and the pressed plate section; wherein
- the support plate section bends and extends from an bottom end edge of the downward hanging plate section in an opposite direction from the base plate section;
- the pivoting plate section inclines and extends upward toward the pressed plate section from at least part in a width direction of an end edge of the support plate section that is on the opposite side from the base plate section, and
- the pressed plate section bends and extends upward from an end edge of the pivoting plate section that is on the opposite side from the base plate section.

9. The impact absorbing steering apparatus according to claim 8, wherein the support plate section further comprises an extending section in a portion that is adjacent in the width direction to a portion that connects the base plate section and the pressed plate section and extending in the forward-backward direction, and wherein the extending section supports the one of the two portions of the cable that are separated in the axial direction.

10. The impact absorbing steering apparatus according to claim 6, wherein
- the front column is an inner column;
- the rear column is an outer column that fits around the rear-end section of the inner column so as to be able to slide in the axial direction;
- a gear housing of a steering force auxiliary apparatus, which is a portion fastened to the front column, is fastened to a front-end section of the inner column;
- the base plate section is fastened to a bottom surface of a rear-end section of the gear housing;
- the pressed plate section has a through hole for a column through which a middle section of the inner column is inserted; and
- the energy-absorbing member is such that when the outer column displaces in the forward direction during a secondary collision, the pressed plate section is pressed in the forward direction by the outer column or a portion that is fastened to the outer column, which is a portion fastened to the rear column, which causes a portion of the support plate section that supports the cable to displace in a downward direction.

11. The impact absorbing steering apparatus according to claim 8, wherein
- the front column is an inner column;
- the rear column is an outer column that fits around the rear-end section of the inner column so as to be able to slide in the axial direction;
- a gear housing of a steering force auxiliary apparatus, which is a portion fastened to the front column, is fastened to a front-end section of the inner column;
- the base plate section is fastened to a bottom surface of a rear-end section of the gear housing;
- the pressed plate section has a through hole for a column through which a middle section of the inner column is inserted; and
- the energy-absorbing member is such that as the outer column displaces in the forward direction during a secondary collision, the pressed plate section is pressed in the forward direction by the outer column or a portion that is fastened to the outer column, which is a portion fastened to the rear column, which causes the support plate section to displace in a downward direction.

12. The impact absorbing steering apparatus according to claim 1, wherein
- the front column is an inner column;
- the rear column is an outer column that fits around the rear-end section of the inner column so as to be able to slide in the axial direction;
- a gear housing of a steering force auxiliary apparatus, which is a portion fastened to the front column, is fastened to a front-end section of the inner column;
- the base plate section is fastened to a bottom surface of the front-end section of the outer column;
- the pressed plate section extends downward going in the forward direction from an front end edge of the base section; and
- when the outer column displaces in the forward direction during a secondary collision, a surface on a top side of the pressed plate section is pressed in the backward direction by the gear housing or a portion fastened to the gear housing, which causes the pressed plate section to pivot in a direction that causes a front-end section of the pressed plate section to displace downward, and causes a portion of the pressed plate section that is pressed by the gear housing or the portion fastened to the gear housing to move in the backward direction.

13. The impact absorbing steering apparatus according to claim 1, wherein
- the front column is an inner column;
- the rear column is an outer column that fits around the rear-end section of the inner column so as to be able to slide in the axial direction;
- a gear housing of a steering force auxiliary apparatus, which is a portion fastened to the front column, is fastened to the front-end section of the inner column;
- the base plate section is fastened to a bottom surface of the rear-end section of the gear housing;
- the pressed plate section extends downward going in the backward direction from a rear end edge of the base plate section; and
- when the outer column displaces in the forward direction during a secondary collision, a surface on a top side of the pressed plate section is pressed in the forward direction by the outer column or a portion fastened to the outer column, which causes the pressed plate section to pivot in a direction that causes a rear-end section of the pressed plate section to displace downward, and causes a portion of the pressed plate section that is pressed by the outer column or the portion fastened to the outer column to move in the forward direction.

* * * * *